US010542260B1

(12) United States Patent
Xu et al.

(10) Patent No.: US 10,542,260 B1
(45) Date of Patent: Jan. 21, 2020

(54) METHOD AND APPARATUS FOR VIDEO CODING

(71) Applicant: Tencent America LLC, Palo Alto, CA (US)

(72) Inventors: Meng Xu, San Jose, CA (US); Xiang Li, Los Gatos, CA (US); Shan Liu, San Jose, CA (US)

(73) Assignee: Tencent America LLC, Palo Alto, CA (US)

(*) Notice: Subject to any disclaimer, the term of this patent is extended or adjusted under 35 U.S.C. 154(b) by 0 days.

(21) Appl. No.: 16/235,614

(22) Filed: Dec. 28, 2018

Related U.S. Application Data

(60) Provisional application No. 62/693,067, filed on Jul. 2, 2018.

(51) Int. Cl.
*H04N 19/132* (2014.01)
*H04N 19/159* (2014.01)
*H04N 19/176* (2014.01)
*H04N 19/119* (2014.01)
*H04N 19/96* (2014.01)

(52) U.S. Cl.
CPC ......... *H04N 19/132* (2014.11); *H04N 19/119* (2014.11); *H04N 19/159* (2014.11); *H04N 19/176* (2014.11); *H04N 19/96* (2014.11)

(58) Field of Classification Search
CPC .. H04N 19/132; H04N 19/176; H04N 19/119; H04N 19/159; H04N 19/139; H04N 19/96
See application file for complete search history.

(56) References Cited

U.S. PATENT DOCUMENTS

| 5,861,922 | A | * | 1/1999 | Murashita | ............ | H04N 9/8047 |
| | | | | | | 375/240.24 |
| 8,526,495 | B2 | | 9/2013 | Liu et al. | | |
| 9,049,452 | B2 | | 6/2015 | Liu et al. | | |
| 9,769,472 | B2 | | 9/2017 | Liu et al. | | |
| 10,212,444 | B2 | | 2/2019 | Li et al. | | |
| 2017/0272782 | A1 | | 9/2017 | Li et al. | | |
| 2018/0316934 | A1 | * | 11/2018 | Nam | .................... | H04N 19/139 |

OTHER PUBLICATIONS

"High Efficiency Video Coding", Recommendation ITU-T H.265 v4, Dec. 2016.

(Continued)

*Primary Examiner* — Obafemi O Sosanya
(74) *Attorney, Agent, or Firm* — Oblon, McClelland, Maier & Neustadt, L.L.P.

(57) ABSTRACT

Aspects of the disclosure provide a method and an apparatus for video decoding. In some embodiments, the apparatus includes processing circuitry. The processing circuitry receives encoding information of a block associated with a picture in a coded video bitstream. The processing circuitry determines whether the block includes a valid region in the picture and an invalid region outside the picture based on the encoding information. Further, the processing circuitry reconstructs at least one sample in the valid region of the block when the block is determined to include the valid region in the picture and the invalid region outside the picture.

19 Claims, 20 Drawing Sheets

(56) References Cited

OTHER PUBLICATIONS

M. Albrecht, et. al, "Description of SDR, HDR, and 360° video coding technology proposal by Fraunhofer HHI", ISO/IEC JTC1/SC29/WG11 JVET-J0014, Apr. 2018.

P. Bordes, et. al, "Description of SDR, HDR and 360° video coding technology proposal by Qualcomm and Technicolor—medium complexity version", ISO/IEC JTC1/SC29/WG11, JVET-J0022, Apr. 2018.

J. Ma, et. al, "Description of Core Experiment: Partitioning," ISO/IEC JTC1/SC29/WG11, JVET-J1021, Apr. 2018.

S. Liu, X. Zhang, S. Lei, "Rectangular partitioning for Intra prediction in HEVC", Visual Communications and Image Processing (VCIP), IEEE, Jan. 2012.

\* cited by examiner

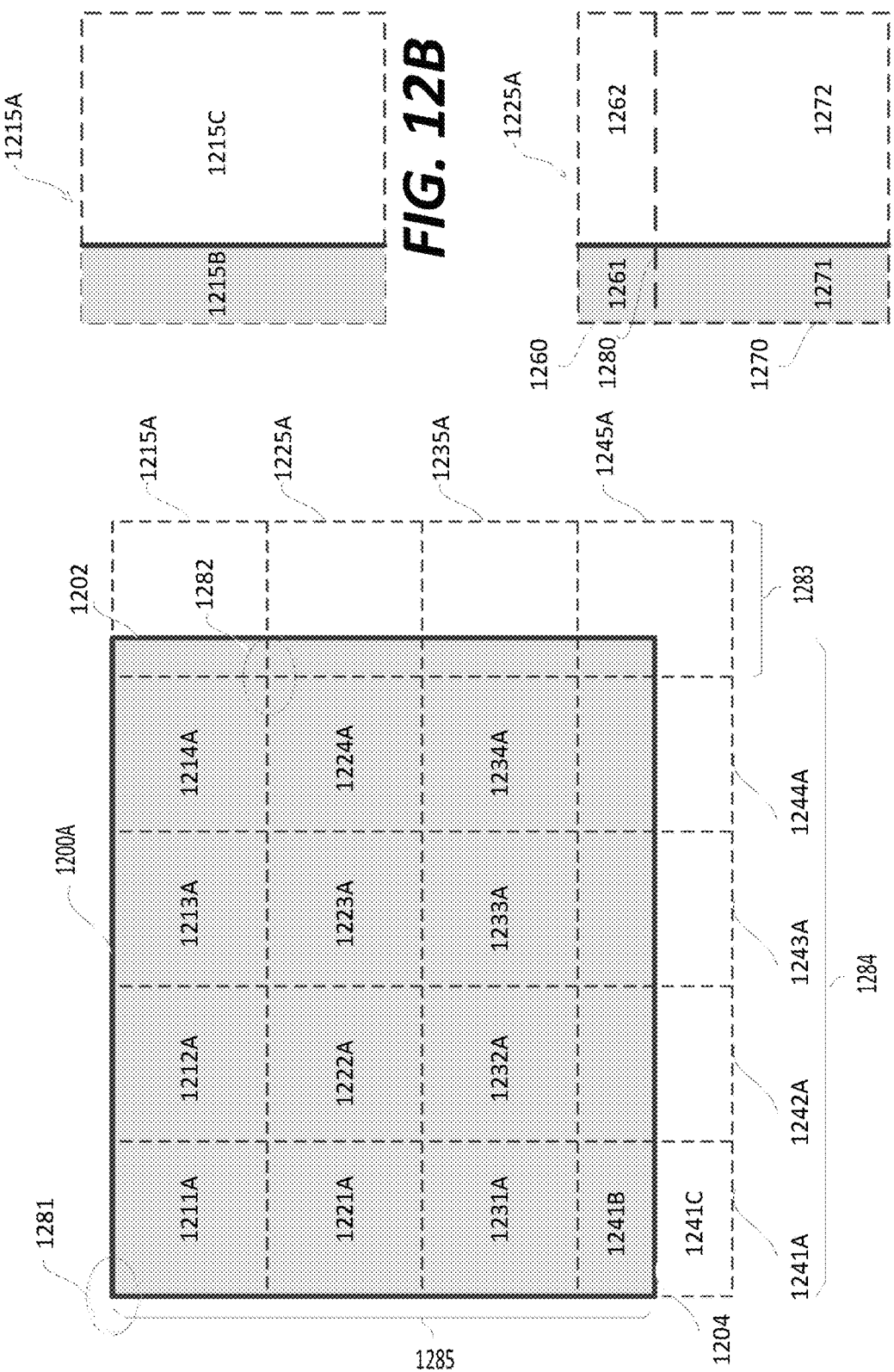

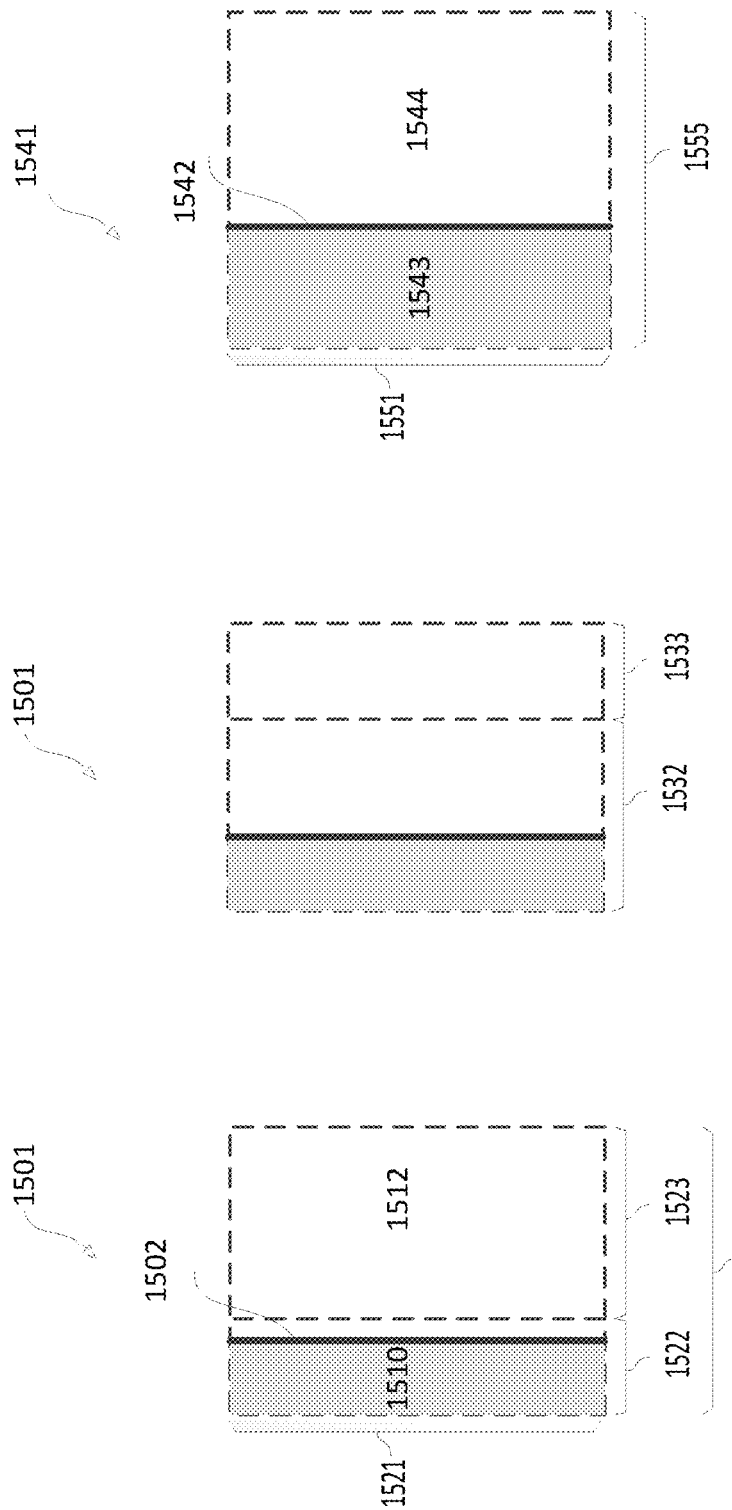

METHOD AND APPARATUS FOR VIDEO CODING

INCORPORATION BY REFERENCE

This present disclosure claims the benefit of priority to U.S. Provisional Application No. 62/693,067, "Partial Coding Unit" filed on Jul. 2, 2018, which is incorporated by reference herein in its entirety.

TECHNICAL FIELD

The present disclosure describes embodiments generally related to video coding.

BACKGROUND

The background description provided herein is for the purpose of generally presenting the context of the disclosure. Work of the presently named inventors, to the extent the work is described in this background section, as well as aspects of the description that may not otherwise qualify as prior art at the time of filing, are neither expressly nor impliedly admitted as prior art against the present disclosure.

Video coding and decoding can be performed using inter-picture prediction with motion compensation. Uncompressed digital video can include a series of pictures, each picture having a spatial dimension of, for example, 1920×1080 luminance samples and associated chrominance samples. The series of pictures can have a fixed or variable picture rate (informally also known as frame rate), of, for example 60 pictures per second or 60 Hz. Uncompressed video has significant bitrate requirements. For example, 1080p60 4:2:0 video at 8 bit per sample (1920×1080 luminance sample resolution at 60 Hz frame rate) requires close to 1.5 Gbit/s bandwidth. An hour of such video requires more than 600 GBytes of storage space.

One purpose of video coding and decoding can be the reduction of redundancy in the input video signal, through compression. Compression can help reduce the aforementioned bandwidth or storage space requirements, in some cases by two orders of magnitude or more. Both lossless and lossy compression, as well as a combination thereof can be employed. Lossless compression refers to techniques where an exact copy of the original signal can be reconstructed from the compressed original signal. When using lossy compression, the reconstructed signal may not be identical to the original signal, but the distortion between original and reconstructed signals is small enough to make the reconstructed signal useful for the intended application. In the case of video, lossy compression is widely employed. The amount of distortion tolerated depends on the application; for example, users of certain consumer streaming applications may tolerate higher distortion than users of television distribution applications. The compression ratio achievable can reflect that: higher allowable/tolerable distortion can yield higher compression ratios.

A video encoder and decoder can utilize techniques from several broad categories, including, for example, motion compensation, transform, quantization, and entropy coding.

Video codec technologies can include techniques known as intra coding. In intra coding, sample values are represented without reference to samples or other data from previously reconstructed reference pictures. In some video codecs, the picture is spatially subdivided into blocks of samples. When all blocks of samples are coded in intra mode, that picture can be an intra picture. Intra pictures and their derivations such as independent decoder refresh pictures, can be used to reset the decoder state and can, therefore, be used as the first picture in a coded video bitstream and a video session, or as a still image. The samples of an intra block can be exposed to a transform, and the transform coefficients can be quantized before entropy coding. Intra prediction can be a technique that minimizes sample values in the pre-transform domain. In some cases, the smaller the DC value after a transform is, and the smaller the AC coefficients are, the fewer the bits that are required at a given quantization step size to represent the block after entropy coding.

Traditional intra coding such as known from, for example MPEG-2 generation coding technologies, does not use intra prediction. However, some newer video compression technologies include techniques that attempt, from, for example, surrounding sample data and/or metadata obtained during the encoding/decoding of spatially neighboring, and preceding in decoding order, blocks of data. Such techniques are henceforth called "intra prediction" techniques. Note that in at least some cases, intra prediction is only using reference data from the current picture under reconstruction and not from reference pictures.

There can be many different forms of intra prediction. When more than one of such techniques can be used in a given video coding technology, the technique in use can be coded in an intra prediction mode. In certain cases, modes can have submodes and/or parameters, and those can be coded individually or included in the mode codeword. Which codeword to use for a given mode/submode/parameter combination can have an impact in the coding efficiency gain through intra prediction, and so can the entropy coding technology used to translate the codewords into a bitstream.

A certain mode of intra prediction was introduced with H.264, refined in H.265, and further refined in newer coding technologies such as joint exploration model (JEM), versatile video coding (VVC), and benchmark set (BMS). A predictor block can be formed using neighboring sample values belonging to already available samples. Sample values of neighboring samples are copied into the predictor block according to a direction. A reference to the direction in use can be coded in the bitstream or may itself be predicted.

Referring to FIG. 1A, depicted in the lower right is a subset of nine predictor directions known from H.265's 35 possible predictor directions. The point where the arrows converge (101) represents the sample being predicted. The arrows represent the direction from which the sample is being predicted. For example, arrow (102) indicates that sample (101) is predicted from a sample or samples to the upper right, at a 45 degree angle from the horizontal. Similarly, arrow (103) indicates that sample (101) is predicted from a sample or samples to the lower left of sample (101), in a 22.5 degree angle from the horizontal.

Still referring to FIG. 1A, on the top left there is depicted a square block (104) of 4×4 samples (indicated by a dashed, boldface line). The square block (104) includes 16 samples, each labelled with an "S", its position in the Y dimension (e.g., row index) and its position in the X dimension (e.g., column index). For example, sample S21 is the second sample in the Y dimension (from the top) and the first (from the left) sample in the X dimension. Similarly, sample S44 is the fourth sample in block (104) in both the Y and X dimensions. As the block is 4×4 samples in size, S44 is at the bottom right. Further shown are reference samples that follow a similar numbering scheme. A reference sample is labelled with an R, its Y position (e.g., row index) and X position (column index) relative to block (104). In both H.264 and H.265, prediction samples neighbor the block under reconstruction; therefore no negative values need to be used.

Intra picture prediction can work by copying reference sample values from the neighboring samples as appropriated by the signaled prediction direction. For example, assume the coded video bitstream includes signaling that, for this block, indicates a prediction direction consistent with arrow (102)—that is, samples are predicted from a prediction sample or samples to the upper right, at a 45 degree angle from the horizontal. In that case, samples S41, S32, S23, and S14 are predicted from the same reference sample R05. Sample S44 is then predicted from reference sample R08.

In certain cases, the values of multiple reference samples may be combined, for example through interpolation, in order to calculate a reference sample; especially when the directions are not evenly divisible by 45 degrees.

The number of possible directions has increased as video coding technology has developed. In H.264 (year 2003), nine different direction could be represented. That increased to 33 in H.265 (year 2013), and JEM/VVC/BMS, at the time of disclosure, can support up to 65 directions. Experiments have been conducted to identify the most likely directions, and certain techniques in the entropy coding are used to represent those likely directions in a small number of bits, accepting a certain penalty for less likely directions. Further, the directions themselves can sometimes be predicted from neighboring directions used in neighboring, already decoded, blocks.

FIG. 1B shows a schematic (110) that depicts 65 intra prediction directions according to JEM to illustrate the increasing number of prediction directions over time.

The mapping of intra prediction directions bits in the coded video bitstream that represent the direction can be different form video coding technology to video coding technology; and can range, for example, from simple direct mappings of prediction direction to intra prediction mode, to codewords, to complex adaptive schemes involving most probably modes, and similar techniques. In all cases, however, there can be certain directions that are statistically less likely to occur in video content than certain other directions. As the goal of video compression is the reduction of redundancy, those less likely directions will, in a well working video coding technology, be represented by a larger number of bits than more likely directions.

Motion compensation can be a lossy compression technique and can relate to techniques where a block of sample data from a previously reconstructed picture or part thereof (reference picture), after being spatially shifted in a direction indicated by a motion vector (MV henceforth), is used for the prediction of a newly reconstructed picture or picture part. In some cases, the reference picture can be the same as the picture currently under reconstruction. MVs can have two dimensions X and Y, or three dimensions, the third being an indication of the reference picture in use (the latter, indirectly, can be a time dimension).

In some video compression techniques, an MV applicable to a certain area of sample data can be predicted from other MVs, for example from those related to another area of sample data spatially adjacent to the area under reconstruction, and preceding that MV in decoding order. Doing so can substantially reduce the amount of data required for coding the MV, thereby removing redundancy and increasing compression. MV prediction can work effectively, for example, because when coding an input video signal derived from a camera (known as natural video) there is a statistical likelihood that areas larger than the area to which a single MV is applicable move in a similar direction and, therefore, can in some cases be predicted using a similar motion vector derived from MVs of neighboring area. That results in the MV found for a given area to be similar or the same as the MV predicted from the surrounding MVs, and that in turn can be represented, after entropy coding, in a smaller number of bits than what would be used if coding the MV directly. In some cases, MV prediction can be an example of lossless compression of a signal (namely: the MVs) derived from the original signal (namely: the sample stream). In other cases, MV prediction itself can be lossy, for example because of rounding errors when calculating a predictor from several surrounding MVs.

Various MV prediction mechanisms are described in H.265/HEVC (ITU-T Rec. H.265, "High Efficiency Video Coding", December 2016). Out of the many MV prediction mechanisms that H.265 offers, described here is a technique henceforth referred to as "spatial merge".

Referring to FIG. 1C, a current block (121) comprises samples that have been found by the encoder during the motion search process to be predictable from a previous block of the same size that has been spatially shifted. Instead of coding that MV directly, the MV can be derived from metadata associated with one or more reference pictures, for example from the most recent (in decoding order) reference picture, using the MV associated with either one of five surrounding samples, denoted A0, A1, and B0, B1, B2 (122 through 126, respectively). In H.265, the MV prediction can use predictors from the same reference picture that the neighboring block is using.

SUMMARY

Aspects of the disclosure provide a method and an apparatus for video decoding. In some embodiments, the apparatus includes processing circuitry. The processing circuitry receives encoding information of a block associated with a picture in a coded video bitstream. The processing circuitry determines whether the block includes a valid region in the picture and an invalid region outside the picture based on the encoding information. Further, the processing circuitry reconstructs at least one sample in the valid region of the block when the block is determined to include the valid region in the picture and the invalid region outside the picture.

In an embodiment, the processing circuitry reconstructs samples only in the valid region of the block where the samples include the at least one sample.

In an embodiment, the at least one sample in the valid region has same prediction information and same transform information.

In an embodiment, the processing circuitry generates at least one prediction for the at least one sample in the valid region using the same prediction information. Further, the processing circuitry obtains at least one piece of residual data for the at least one sample using the same transform information, and reconstructs the at least one sample based on the at least one prediction and the at least one piece of residual data.

In an embodiment, the valid region has a rectangular shape with a width and a height, and one of the width and the height is not a power of 2. The processing circuitry generates at least one prediction for the at least one sample in the valid region only using a skip mode, and reconstructs the at least one sample based on the at least one prediction without residual data.

In an embodiment, the valid region has a rectangular shape with a width and a height, and one of the width and the height is not a power of 2. The processing circuitry generates at least one prediction for the at least one sample in the valid region using one of: an intra prediction mode and an inter prediction mode. Further, the processing circuitry reconstructs the at least one sample based on the at least one prediction without residual data.

In an embodiment, the block is divisible into a number of rectangular sub-blocks that have widths and heights being powers of 2, and the number of divisions to obtain the rectangular sub-blocks is less than a predetermined threshold.

In an embodiment, the valid region of the block is not obtainable by a single split of the block by one of: a quadtree split and a binary tree split.

In an embodiment, the encoding information includes a non-split flag indicating that the block includes the valid region in the picture and the invalid region outside the picture.

Aspects of the disclosure also provide a non-transitory computer-readable medium storing instructions which when executed by a computer for video decoding cause the computer to perform the method for video coding.

BRIEF DESCRIPTION OF THE DRAWINGS

Further features, the nature, and various advantages of the disclosed subject matter will be more apparent from the following detailed description and the accompanying drawings in which:

FIG. 12A shows an example of coding tree units that include areas outside a picture according to an embodiment of the disclosure.

FIGS. 12B-12C show examples of partial coding units according to embodiments of the disclosure.

FIGS. 15A-B show examples of partial coding units according to embodiments of the disclosure.

FIG. 15C shows an example where a partial coding unit is not used according to an embodiment of the disclosure.

DETAILED DESCRIPTION OF EMBODIMENTS

Figure 1A:
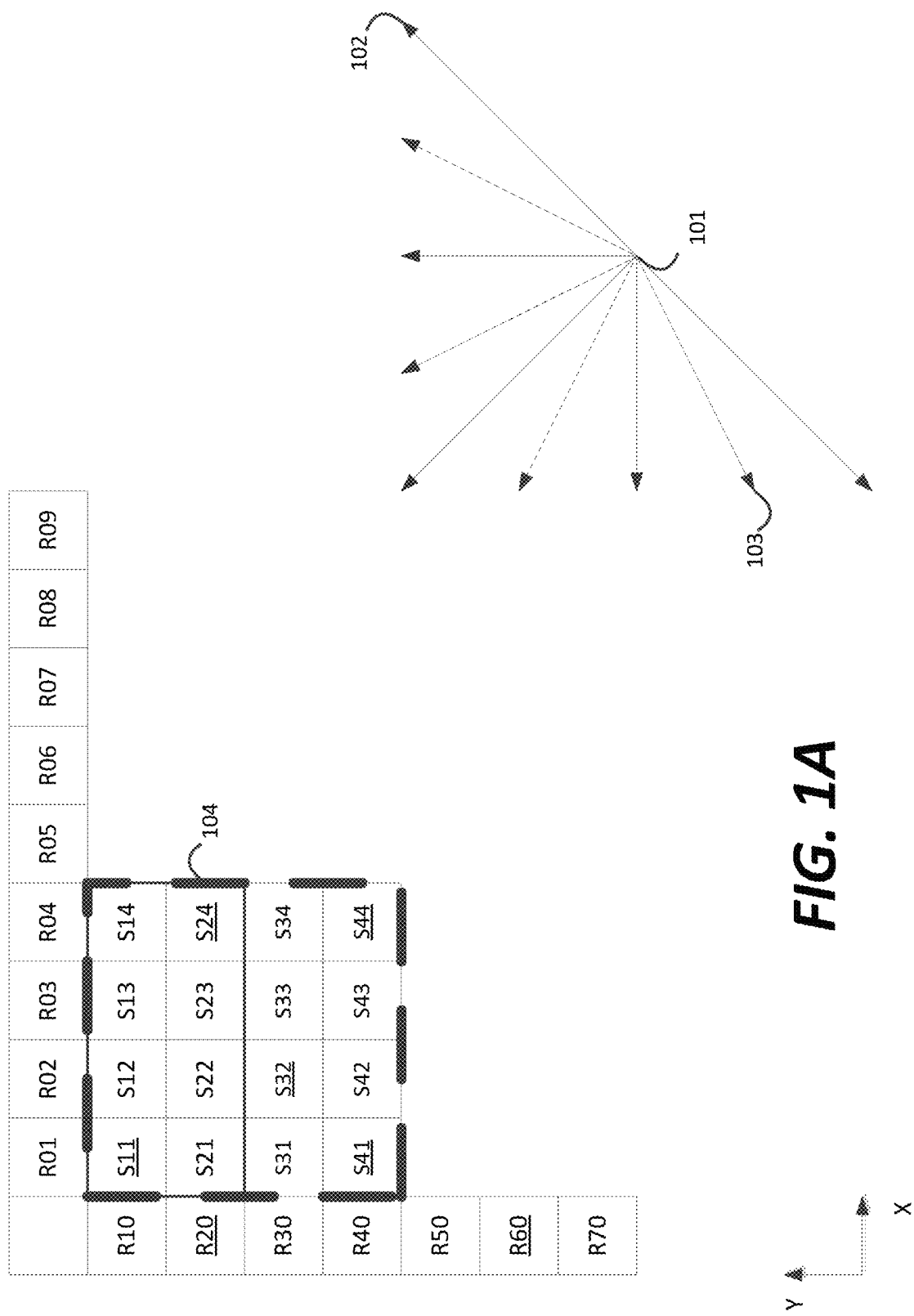
FIG. 1A is a schematic illustration of an exemplary subset of intra prediction modes.
Figure 1B:
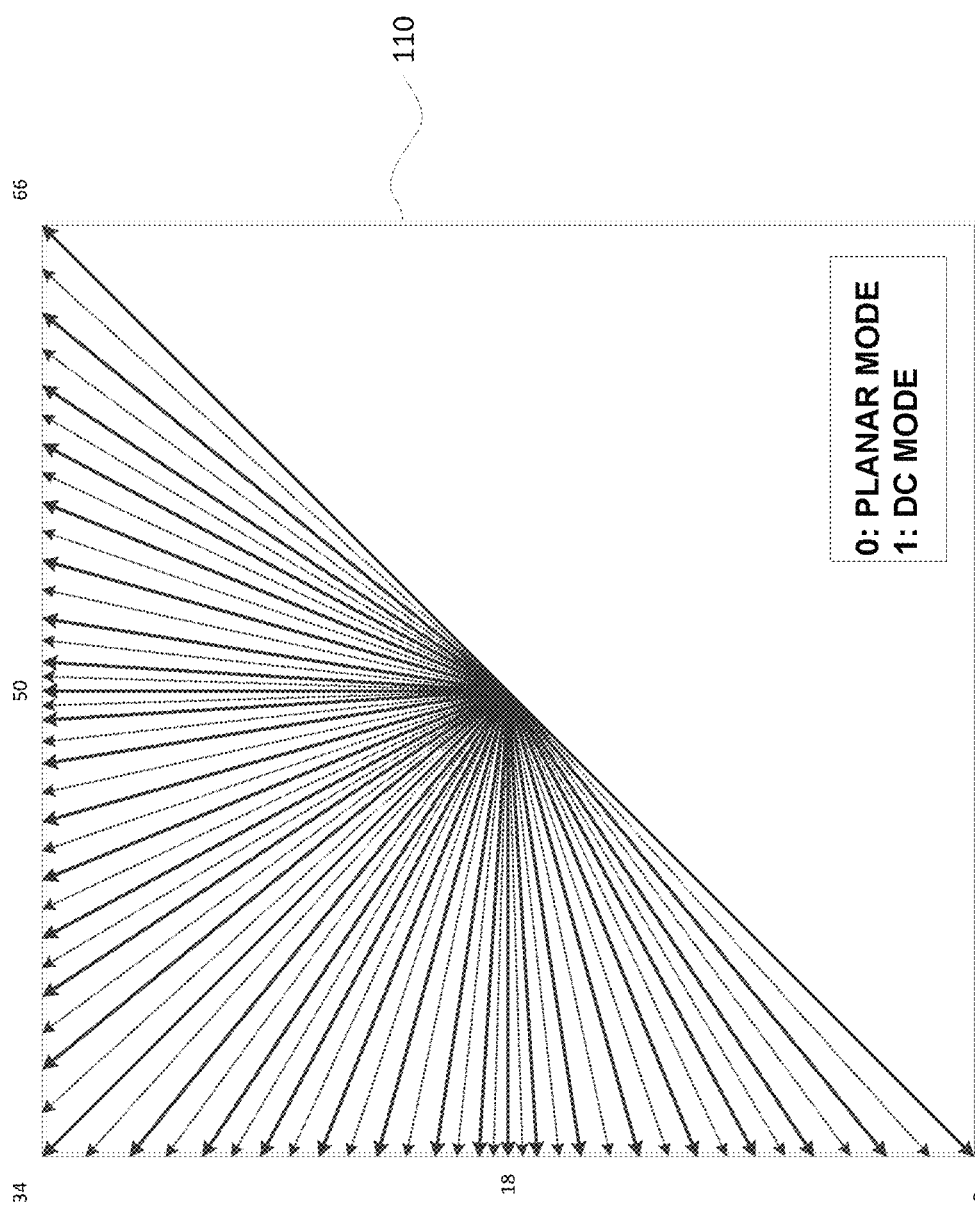
FIG. 1B is an illustration of exemplary intra prediction directions.
Figure 1C:
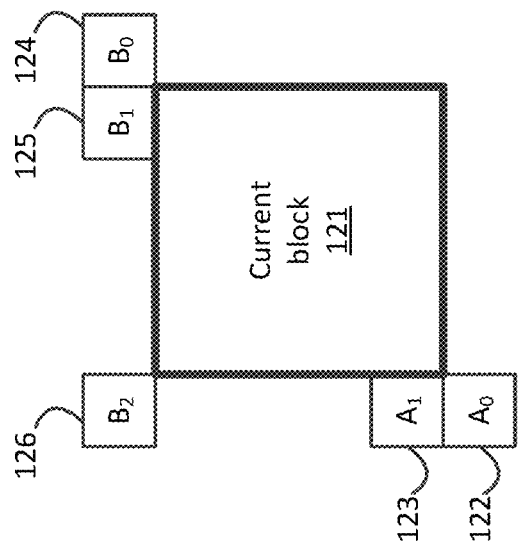
FIG. 1C is a schematic illustration of a current block and its surrounding spatial merge candidates in one example.
Figure 2:
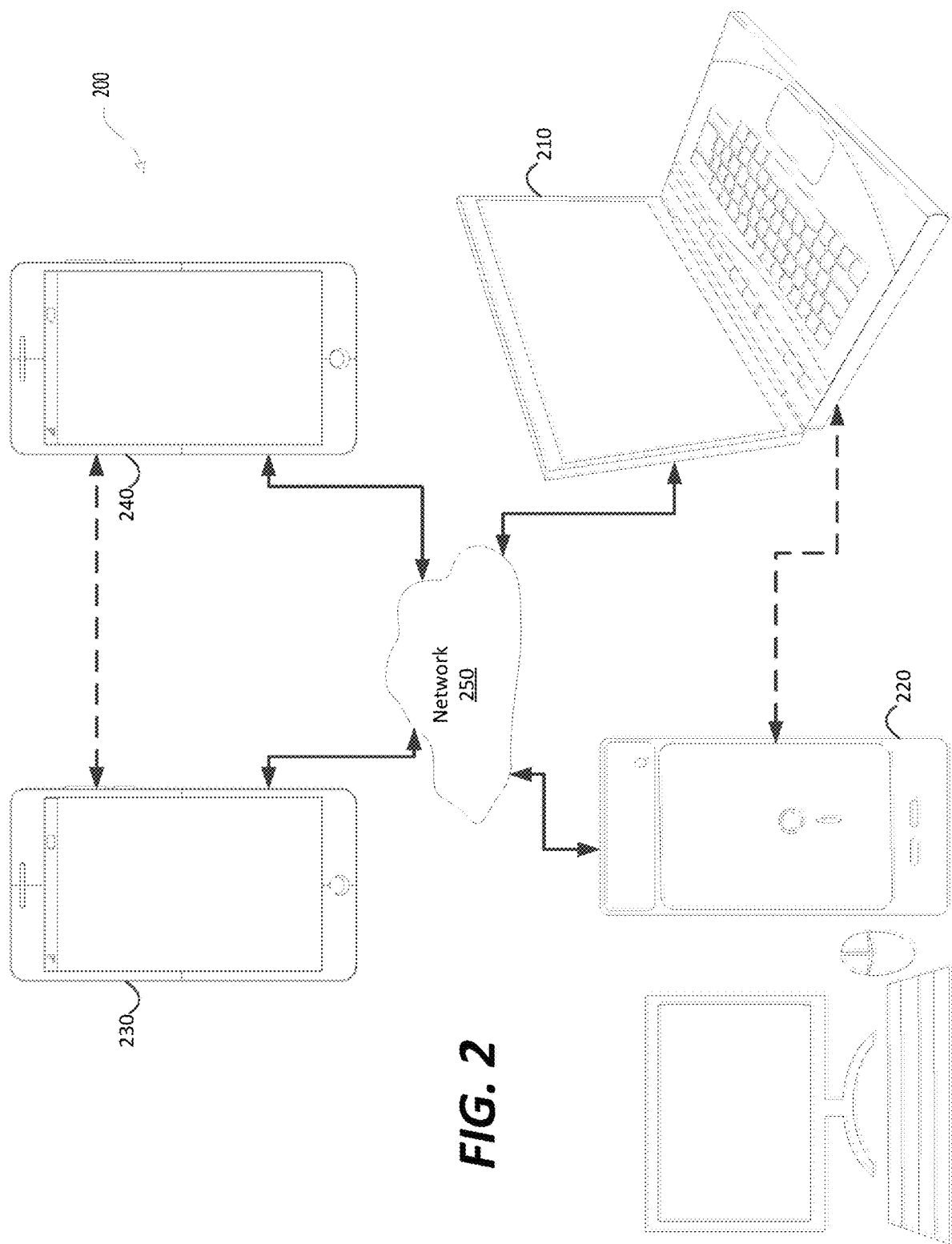
FIG. 2 is a schematic illustration of a simplified block diagram of a communication system (200) in accordance with an embodiment.

FIG. 2 illustrates a simplified block diagram of a communication system (200) according to an embodiment of the present disclosure. The communication system (200) includes a plurality of terminal devices that can communicate with each other, via, for example, a network (250). For example, the communication system (200) includes a first pair of terminal devices (210) and (220) interconnected via the network (250). In the FIG. 2 example, the first pair of terminal devices (210) and (220) performs unidirectional transmission of data. For example, the terminal device (210) may code video data (e.g., a stream of video pictures that are captured by the terminal device (210)) for transmission to the other terminal device (220) via the network (250). The encoded video data can be transmitted in the form of one or more coded video bitstreams. The terminal device (220) may receive the coded video data from the network (250), decode the coded video data to recover the video pictures and display video pictures according to the recovered video data. Unidirectional data transmission may be common in media serving applications and the like.

In another example, the communication system (200) includes a second pair of terminal devices (230) and (240) that performs bidirectional transmission of coded video data that may occur, for example, during videoconferencing. For bidirectional transmission of data, in an example, each terminal device of the terminal devices (230) and (240) may code video data (e.g., a stream of video pictures that are captured by the terminal device) for transmission to the other terminal device of the terminal devices (230) and (240) via the network (250). Each terminal device of the terminal devices (230) and (240) also may receive the coded video data transmitted by the other terminal device of the terminal devices (230) and (240), and may decode the coded video data to recover the video pictures and may display video pictures at an accessible display device according to the recovered video data.

In the FIG. 2 example, the terminal devices (210), (220), (230) and (240) may be illustrated as servers, personal computers and smart phones but the principles of the present disclosure may be not so limited. Embodiments of the present disclosure find application with laptop computers, tablet computers, media players and/or dedicated video conferencing equipment. The network (250) represents any number of networks that convey coded video data among the terminal devices (210), (220), (230) and (240), including for example wireline (wired) and/or wireless communication networks. The communication network (250) may exchange data in circuit-switched and/or packet-switched channels. Representative networks include telecommunications networks, local area networks, wide area networks and/or the Internet. For the purposes of the present discussion, the architecture and topology of the network (250) may be immaterial to the operation of the present disclosure unless explained herein below.

Figure 3:
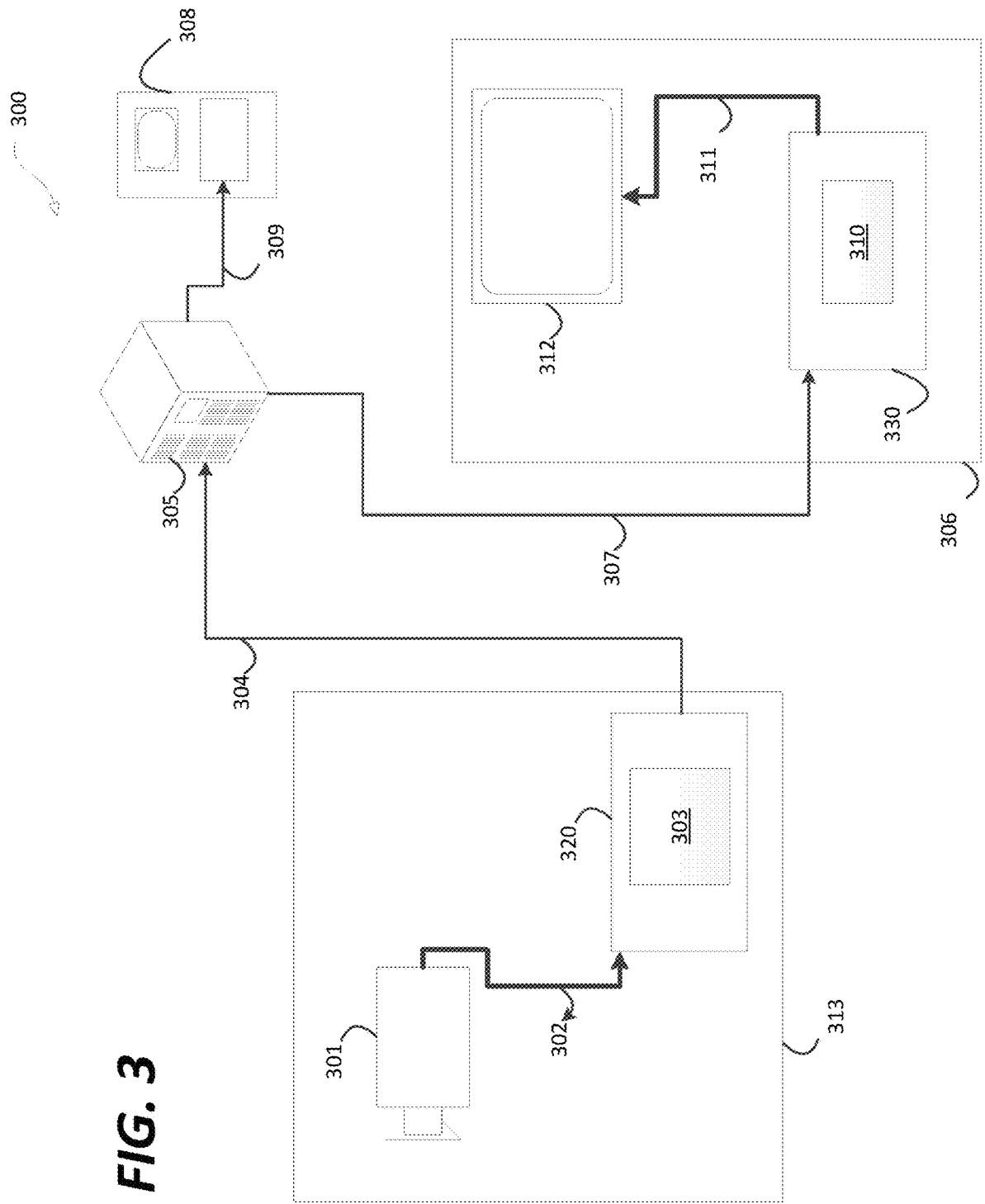
FIG. 3 is a schematic illustration of a simplified block diagram of a communication system (300) in accordance with an embodiment.

FIG. 3 illustrates, as an example for an application for the disclosed subject matter, the placement of a video encoder and a video decoder in a streaming environment. The disclosed subject matter can be equally applicable to other video enabled applications, including, for example, video conferencing, digital TV, storing of compressed video on digital media including CD, DVD, memory stick and the like, and so on.

A streaming system may include a capture subsystem (313), that can include a video source (301), for example a digital camera, creating for example a stream of video pictures (302) that are uncompressed. In an example, the stream of video pictures (302) includes samples that are taken by the digital camera. The stream of video pictures (302), depicted as a bold line to emphasize a high data volume when compared to encoded video data (304) (or coded video bitstreams), can be processed by an electronic device (320) that includes a video encoder (303) coupled to the video source (301). The video encoder (303) can include hardware, software, or a combination thereof to enable or implement aspects of the disclosed subject matter as described in more detail below. The encoded video data (304) (or encoded video bitstream (304)), depicted as a thin line to emphasize the lower data volume when compared to the stream of video pictures (302), can be stored on a streaming server (305) for future use. One or more streaming client subsystems, such as client subsystems (306) and (308) in FIG. 3 can access the streaming server (305) to retrieve copies (307) and (309) of the encoded video data (304). A client subsystem (306) can include a video decoder (310), for example, in an electronic device (330). The video decoder (310) decodes the incoming copy (307) of the encoded video data and creates an outgoing stream of video pictures (311) that can be rendered on a display (312) (e.g., display screen) or other rendering device (not depicted). In some streaming systems, the encoded video data (304), (307), and (309) (e.g., video bitstreams) can be encoded according to certain video coding/compression standards. Examples of those standards include ITU-T Recommendation H.265. In an example, a video coding standard under development is informally known as Versatile Video Coding (VVC). The disclosed subject matter may be used in the context of VVC.

It is noted that the electronic devices (320) and (330) can include other components (not shown). For example, the electronic device (320) can include a video decoder (not shown) and the electronic device (330) can include a video encoder (not shown) as well.

Figure 4:
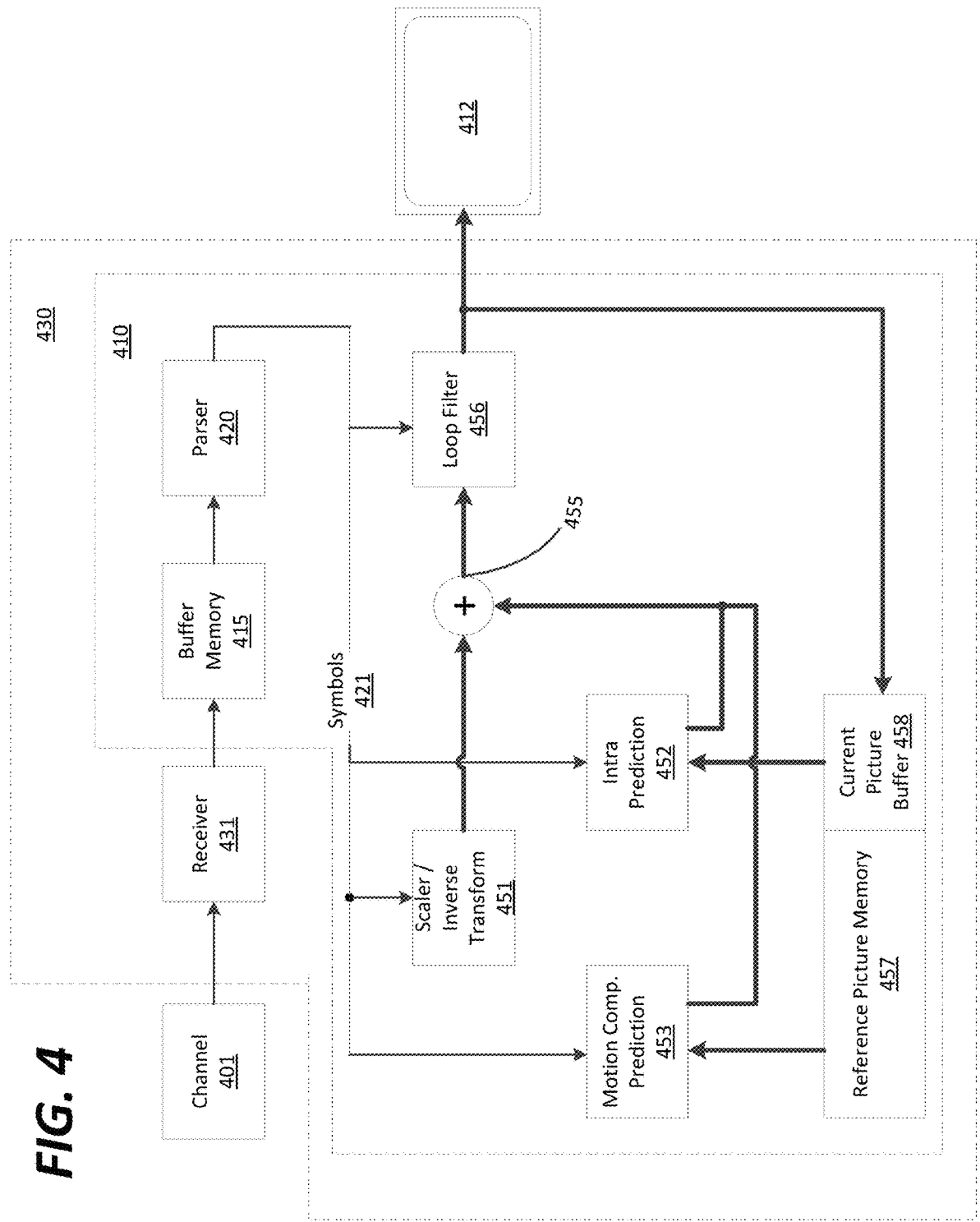
FIG. 4 is a schematic illustration of a simplified block diagram of a decoder in accordance with an embodiment.

FIG. 4 shows a block diagram of a video decoder (410) according to an embodiment of the present disclosure. The video decoder (410) can be included in an electronic device (430). The electronic device (430) can include a receiver (431) (e.g., receiving circuitry). The video decoder (410) can be used in the place of the video decoder (310) in the FIG. 3 example.

The receiver (431) may receive one or more coded video sequences to be decoded by the video decoder (410); in the same or another embodiment, one coded video sequence at a time, where the decoding of each coded video sequence is independent from other coded video sequences. The coded video sequence may be received from a channel (401), which may be a hardware/software link to a storage device which stores the encoded video data. The receiver (431) may receive the encoded video data with other data, for example, coded audio data and/or ancillary data streams, that may be forwarded to their respective using entities (not depicted). The receiver (431) may separate the coded video sequence from the other data. To combat network jitter, a buffer memory (415) may be coupled in between the receiver (431) and an entropy decoder/parser (420) ("parser (420)" henceforth). In certain applications, the buffer memory (415) is part of the video decoder (410). In others, it can be outside of the video decoder (410) (not depicted). In still others, there can be a buffer memory (not depicted) outside of the video decoder (410), for example to combat network jitter, and in addition another buffer memory (415) inside the video decoder (410), for example to handle playout timing. When the receiver (431) is receiving data from a store/forward device of sufficient bandwidth and controllability, or from an isosynchronous network, the buffer memory (415) may not be needed, or can be small. For use on best effort packet networks such as the Internet, the buffer memory (415) may be required, can be comparatively large and can be advantageously of adaptive size, and may at least partially be implemented in an operating system or similar elements (not depicted) outside of the video decoder (410).

The video decoder (410) may include the parser (420) to reconstruct symbols (421) from the coded video sequence. Categories of those symbols include information used to manage operation of the video decoder (410), and potentially information to control a rendering device such as a render device (412) (e.g., a display screen) that is not an integral part of the electronic device (430) but can be coupled to the electronic device (430), as was shown in FIG. 4. The control information for the rendering device(s) may be in the form of Supplemental Enhancement Information (SEI messages) or Video Usability Information (VUI) parameter set fragments (not depicted). The parser (420) may parse/entropy-decode the coded video sequence that is received. The coding of the coded video sequence can be in accordance with a video coding technology or standard, and can follow various principles, including variable length coding, Huffman coding, arithmetic coding with or without context sensitivity, and so forth. The parser (420) may extract from the coded video sequence, a set of subgroup parameters for at least one of the subgroups of pixels in the video decoder, based upon at least one parameter corresponding to the group. Subgroups can include Groups of Pictures (GOPs), pictures, tiles, slices, macroblocks, Coding Units (CUs), blocks, Transform Units (TUs), Prediction Units (PUs) and so forth. The parser (420) may also extract from the coded video sequence information such as transform coefficients, quantizer parameter values, motion vectors, and so forth.

The parser (420) may perform an entropy decoding/parsing operation on the video sequence received from the buffer memory (415), so as to create symbols (421).

Reconstruction of the symbols (421) can involve multiple different units depending on the type of the coded video picture or parts thereof (such as: inter and intra picture, inter and intra block), and other factors. Which units are involved, and how, can be controlled by the subgroup control information that was parsed from the coded video sequence by the parser (420). The flow of such subgroup control information between the parser (420) and the multiple units below is not depicted for clarity.

Beyond the functional blocks already mentioned, the video decoder (410) can be conceptually subdivided into a number of functional units as described below. In a practical implementation operating under commercial constraints, many of these units interact closely with each other and can, at least partly, be integrated into each other. However, for the purpose of describing the disclosed subject matter, the conceptual subdivision into the functional units below is appropriate.

A first unit is the scaler/inverse transform unit (451). The scaler/inverse transform unit (451) receives a quantized transform coefficient as well as control information, including which transform to use, block size, quantization factor, quantization scaling matrices, etc. as symbol(s) (421) from the parser (420). The scaler/inverse transform unit (451) can output blocks comprising sample values, that can be input into aggregator (455).

In some cases, the output samples of the scaler/inverse transform (451) can pertain to an intra coded block; that is: a block that is not using predictive information from previously reconstructed pictures, but can use predictive information from previously reconstructed parts of the current picture. Such predictive information can be provided by an intra picture prediction unit (452). In some cases, the intra picture prediction unit (452) generates a block of the same size and shape of the block under reconstruction, using surrounding already reconstructed information fetched from the current picture buffer (458). The current picture buffer (458) buffers, for example, partly reconstructed current picture and/or fully reconstructed current picture. The aggregator (455), in some cases, adds, on a per sample basis, the prediction information the intra prediction unit (452) has generated to the output sample information as provided by the scaler/inverse transform unit (451).

In other cases, the output samples of the scaler/inverse transform unit (451) can pertain to an inter coded, and potentially motion compensated block. In such a case, a motion compensation prediction unit (453) can access reference picture memory (457) to fetch samples used for prediction. After motion compensating the fetched samples in accordance with the symbols (421) pertaining to the block, these samples can be added by the aggregator (455) to the output of the scaler/inverse transform unit (451) (in this case called the residual samples or residual signal) so as to generate output sample information. The addresses within the reference picture memory (457) from where the motion compensation prediction unit (453) fetches prediction samples can be controlled by motion vectors, available to the motion compensation prediction unit (453) in the form of symbols (421) that can have, for example X, Y, and reference picture components. Motion compensation also can include interpolation of sample values as fetched from the reference picture memory (457) when sub-sample exact motion vectors are in use, motion vector prediction mechanisms, and so forth.

The output samples of the aggregator (455) can be subject to various loop filtering techniques in the loop filter unit (456). Video compression technologies can include in-loop filter technologies that are controlled by parameters included in the coded video sequence (also referred to as coded video bitstream) and made available to the loop filter unit (456) as symbols (421) from the parser (420), but can also be responsive to meta-information obtained during the decoding of previous (in decoding order) parts of the coded picture or coded video sequence, as well as responsive to previously reconstructed and loop-filtered sample values.

The output of the loop filter unit (456) can be a sample stream that can be output to the render device (412) as well as stored in the reference picture memory (457) for use in future inter-picture prediction.

Certain coded pictures, once fully reconstructed, can be used as reference pictures for future prediction. For example, once a coded picture corresponding to a current picture is fully reconstructed and the coded picture has been identified as a reference picture (by, for example, the parser (420)), the current picture buffer (458) can become a part of the reference picture memory (457), and a fresh current picture buffer can be reallocated before commencing the reconstruction of the following coded picture.

The video decoder (410) may perform decoding operations according to a predetermined video compression technology in a standard, such as ITU-T Rec. H.265. The coded video sequence may conform to a syntax specified by the video compression technology or standard being used, in the sense that the coded video sequence adheres to both the syntax of the video compression technology or standard and the profiles as documented in the video compression technology or standard. Specifically, a profile can select certain tools as the only tools available for use under that profile from all the tools available in the video compression technology or standard. Also necessary for compliance can be that the complexity of the coded video sequence is within bounds as defined by the level of the video compression technology or standard. In some cases, levels restrict the maximum picture size, maximum frame rate, maximum reconstruction sample rate (measured in, for example megasamples per second), maximum reference picture size, and so on. Limits set by levels can, in some cases, be further restricted through Hypothetical Reference Decoder (HRD) specifications and metadata for HRD buffer management signaled in the coded video sequence.

In an embodiment, the receiver (431) may receive additional (redundant) data with the encoded video. The additional data may be included as part of the coded video sequence(s). The additional data may be used by the video decoder (410) to properly decode the data and/or to more accurately reconstruct the original video data. Additional data can be in the form of, for example, temporal, spatial, or signal noise ratio (SNR) enhancement layers, redundant slices, redundant pictures, forward error correction codes, and so on.

Figure 5:
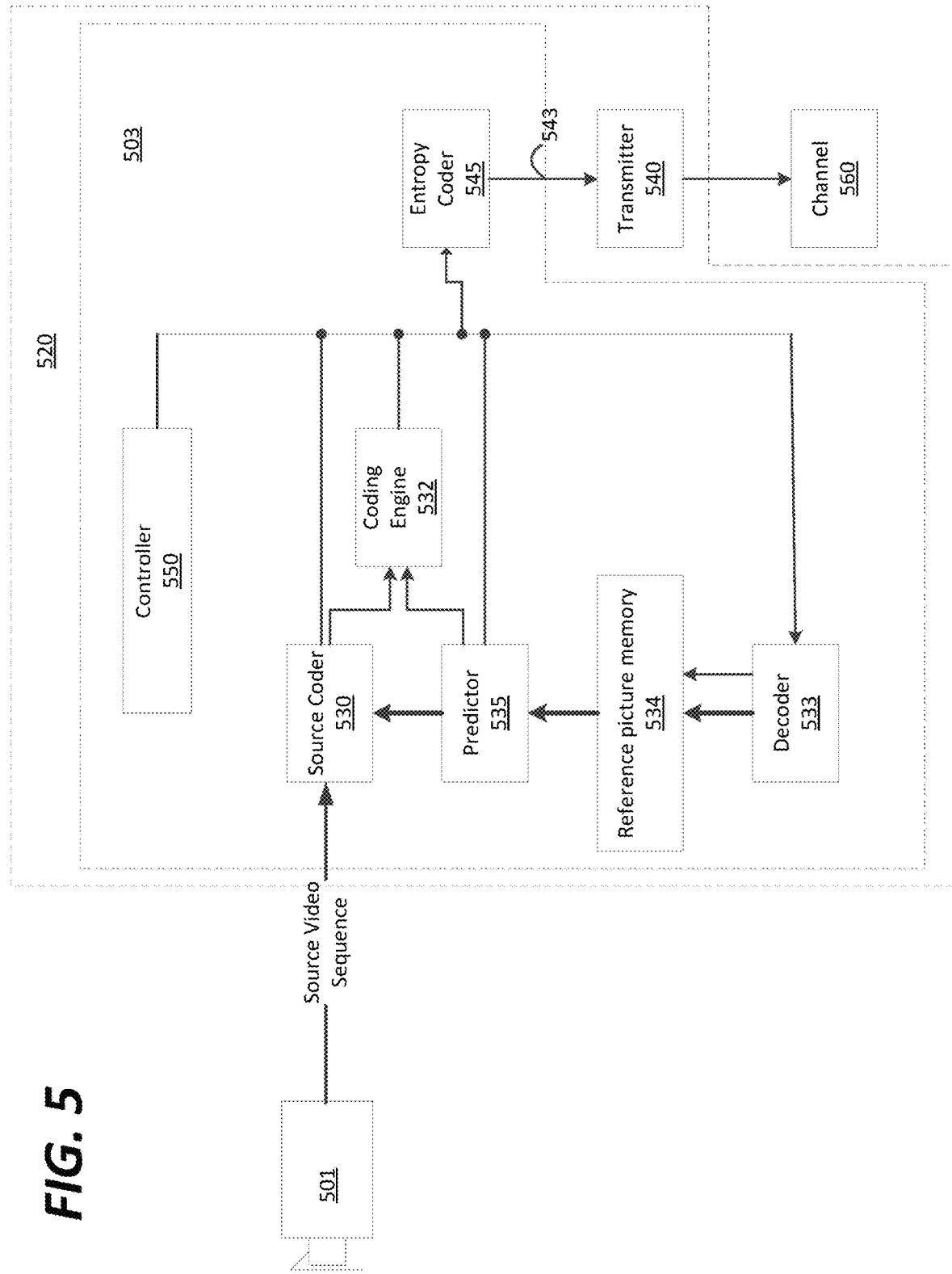
FIG. 5 is a schematic illustration of a simplified block diagram of an encoder in accordance with an embodiment.

FIG. 5 shows a block diagram of a video encoder (503) according to an embodiment of the present disclosure. The video encoder (503) is included in an electronic device (520). The electronic device (520) includes a transmitter (540) (e.g., transmitting circuitry). The video encoder (503) can be used in the place of the video encoder (303) in the FIG. 3 example.

The video encoder (503) may receive video samples from a video source (501) (that is not part of the electronic device (520) in the FIG. 5 example) that may capture video image(s) to be coded by the video encoder (503). In another example, the video source (501) is a part of the electronic device (520).

The video source (501) may provide the source video sequence to be coded by the video encoder (503) in the form of a digital video sample stream that can be of any suitable bit depth (for example: 8 bit, 10 bit, 12 bit, . . . ), any color space (for example, BT.601 Y CrCB, RGB, . . . ), and any suitable sampling structure (for example Y CrCb 4:2:0, Y CrCb 4:4:4). In a media serving system, the video source (501) may be a storage device storing previously prepared video. In a videoconferencing system, the video source (501) may be a camera that captures local image information as a video sequence. Video data may be provided as a plurality of individual pictures that impart motion when viewed in sequence. The pictures themselves may be organized as a spatial array of pixels, wherein each pixel can comprise one or more samples depending on the sampling structure, color space, etc. in use. A person skilled in the art can readily understand the relationship between pixels and samples. The description below focuses on samples.

According to an embodiment, the video encoder (503) may code and compress the pictures of the source video sequence into a coded video sequence (543) in real time or under any other time constraints as required by the application. Enforcing appropriate coding speed is one function of a controller (550). In some embodiments, the controller (550) controls other functional units as described below and is functionally coupled to the other functional units. The coupling is not depicted for clarity. Parameters set by the controller (550) can include rate control related parameters (picture skip, quantizer, lambda value of rate-distortion optimization techniques, . . . ), picture size, group of pictures (GOP) layout, maximum motion vector search range, and so forth. The controller (550) can be configured to have other suitable functions that pertain to the video encoder (503) optimized for a certain system design.

In some embodiments, the video encoder (503) is configured to operate in a coding loop. As an oversimplified description, in an example, the coding loop can include a source coder (530) (e.g., responsible for creating symbols, such as a symbol stream, based on an input picture to be coded, and a reference picture(s)), and a (local) decoder (533) embedded in the video encoder (503). The decoder (533) reconstructs the symbols to create the sample data in a similar manner as a (remote) decoder also would create (as any compression between symbols and coded video bitstream is lossless in the video compression technologies considered in the disclosed subject matter). The reconstructed sample stream (sample data) is input to the reference picture memory (534). As the decoding of a symbol stream leads to bit-exact results independent of decoder location (local or remote), the content in the reference picture memory (534) is also bit exact between the local encoder and remote encoder. In other words, the prediction part of an encoder "sees" as reference picture samples exactly the same sample values as a decoder would "see" when using prediction during decoding. This fundamental principle of reference picture synchronicity (and resulting drift, if synchronicity cannot be maintained, for example because of channel errors) is used in some related arts as well.

The operation of the "local" decoder (533) can be the same as of a "remote" decoder, such as the video decoder (410), which has already been described in detail above in conjunction with FIG. 4. Briefly referring also to FIG. 4, however, as symbols are available and encoding/decoding of symbols to a coded video sequence by an entropy coder (545) and the parser (420) can be lossless, the entropy decoding parts of the video decoder (410), including the buffer memory (415), and parser (420) may not be fully implemented in the local decoder (533).

An observation that can be made at this point is that any decoder technology except the parsing/entropy decoding that is present in a decoder also necessarily needs to be present, in substantially identical functional form, in a corresponding encoder. For this reason, the disclosed subject matter focuses on decoder operation. The description of encoder technologies can be abbreviated as they are the inverse of the comprehensively described decoder technologies. Only in certain areas a more detail description is required and provided below.

During operation, in some examples, the source coder (530) may perform motion compensated predictive coding, which codes an input picture predictively with reference to one or more previously-coded picture from the video sequence that were designated as "reference pictures". In this manner, the coding engine (532) codes differences between pixel blocks of an input picture and pixel blocks of reference picture(s) that may be selected as prediction reference(s) to the input picture.

The local video decoder (533) may decode coded video data of pictures that may be designated as reference pictures, based on symbols created by the source coder (530). Operations of the coding engine (532) may advantageously be lossy processes. When the coded video data may be decoded at a video decoder (not shown in FIG. 5), the reconstructed video sequence typically may be a replica of the source video sequence with some errors. The local video decoder (533) replicates decoding processes that may be performed by the video decoder on reference pictures and may cause reconstructed reference pictures to be stored in the reference picture cache (534). In this manner, the video encoder (503) may store copies of reconstructed reference pictures locally that have common content as the reconstructed reference pictures that will be obtained by a far-end video decoder (absent transmission errors).

The predictor (535) may perform prediction searches for the coding engine (532). That is, for a new picture to be coded, the predictor (535) may search the reference picture memory (534) for sample data (as candidate reference pixel blocks) or certain metadata such as reference picture motion vectors, block shapes, and so on, that may serve as an appropriate prediction reference for the new pictures. The predictor (535) may operate on a sample block-by-pixel block basis to find appropriate prediction references. In some cases, as determined by search results obtained by the predictor (535), an input picture may have prediction references drawn from multiple reference pictures stored in the reference picture memory (534).

The controller (550) may manage coding operations of the source coder (530), including, for example, setting of parameters and subgroup parameters used for encoding the video data.

Output of all aforementioned functional units may be subjected to entropy coding in the entropy coder (545). The entropy coder (545) translates the symbols as generated by the various functional units into a coded video sequence, by lossless compressing the symbols according to technologies such as Huffman coding, variable length coding, arithmetic coding, and so forth.

The transmitter (540) may buffer the coded video sequence(s) as created by the entropy coder (545) to prepare for transmission via a communication channel (560), which may be a hardware/software link to a storage device which would store the encoded video data. The transmitter (540) may merge coded video data from the video coder (503) with other data to be transmitted, for example, coded audio data and/or ancillary data streams (sources not shown).

The controller (550) may manage operation of the video encoder (503). During coding, the controller (550) may assign to each coded picture a certain coded picture type, which may affect the coding techniques that may be applied to the respective picture. For example, pictures often may be assigned as one of the following picture types:

An intra picture (I picture) may be one that may be coded and decoded without using any other picture in the sequence as a source of prediction. Some video codecs allow for different types of intra pictures, including, for example Independent Decoder Refresh ("IDR") Pictures. A person skilled in the art is aware of those variants of I pictures and their respective applications and features.

A predictive picture (P picture) may be one that may be coded and decoded using intra prediction or inter prediction using at most one motion vector and reference index to predict the sample values of each block.

A bi-directionally predictive picture (B Picture) may be one that may be coded and decoded using intra prediction or inter prediction using at most two motion vectors and reference indices to predict the sample values of each block. Similarly, multiple-predictive pictures can use more than two reference pictures and associated metadata for the reconstruction of a single block.

Source pictures commonly may be subdivided spatially into a plurality of sample blocks (for example, blocks of 4×4, 8×8, 4×8, or 16×16 samples each) and coded on a block-by-block basis. Blocks may be coded predictively with reference to other (already coded) blocks as determined by the coding assignment applied to the blocks' respective pictures. For example, blocks of I pictures may be coded non-predictively or they may be coded predictively with reference to already coded blocks of the same picture (spatial prediction or intra prediction). Pixel blocks of P pictures may be coded predictively, via spatial prediction or via temporal prediction with reference to one previously coded reference picture. Blocks of B pictures may be coded predictively, via spatial prediction or via temporal prediction with reference to one or two previously coded reference pictures.

The video encoder (503) may perform coding operations according to a predetermined video coding technology or standard, such as ITU-T Rec. H.265. In its operation, the video encoder (503) may perform various compression operations, including predictive coding operations that exploit temporal and spatial redundancies in the input video sequence. The coded video data, therefore, may conform to a syntax specified by the video coding technology or standard being used.

In an embodiment, the transmitter (540) may transmit additional data with the encoded video. The source coder (530) may include such data as part of the coded video sequence. Additional data may comprise temporal/spatial/SNR enhancement layers, other forms of redundant data such as redundant pictures and slices, SEI messages, VUI parameter set fragments, and so on.

A video may be captured as a plurality of source pictures (video pictures) in a temporal sequence. Intra-picture prediction (often abbreviated to intra prediction) makes use of spatial correlation in a given picture, and inter-picture prediction makes uses of the (temporal or other) correlation between the pictures. In an example, a specific picture under encoding/decoding, which is referred to as a current picture, is partitioned into blocks. When a block in the current picture is similar to a reference block in a previously coded and still buffered reference picture in the video, the block in the current picture can be coded by a vector that is referred to as a motion vector. The motion vector points to the reference block in the reference picture, and can have a third dimension identifying the reference picture, in case multiple reference pictures are in use.

In some embodiments, a bi-prediction technique can be used in the inter-picture prediction. According to the bi-prediction technique, two reference pictures, such as a first reference picture and a second reference picture that are both prior in decoding order to the current picture in the video (but may be in the past and future, respectively, in display order) are used. A block in the current picture can be coded by a first motion vector that points to a first reference block in the first reference picture, and a second motion vector that points to a second reference block in the second reference picture. The block can be predicted by a combination of the first reference block and the second reference block.

Further, a merge mode technique can be used in the inter-picture prediction to improve coding efficiency.

According to some embodiments of the disclosure, predictions, such as inter-picture predictions and intra-picture predictions are performed in the unit of blocks. For example, according to the HEVC standard, a picture in a sequence of video pictures is partitioned into coding tree units (CTUs) for compression, the CTUs in a picture have the same size, such as 64×64 pixels, 32×32 pixels, or 16×16 pixels. In general, a CTU includes three coding tree blocks (CTBs), which are one luma CTB and two chroma CTBs. Each CTU can be recursively quadtree split into one or multiple coding units (CUs). For example, a CTU of 64×64 pixels can be split into one CU of 64×64 pixels, or 4 CUs of 32×32 pixels, or 16 CUs of 16×16 pixels. In an example, each CU is analyzed to determine a prediction type for the CU, such as an inter prediction type or an intra prediction type. The CU is split into one or more prediction units (PUs) depending on the temporal and/or spatial predictability. Generally, each PU includes a luma prediction block (PB), and two chroma PBs. In an embodiment, a prediction operation in coding (encoding/decoding) is performed in the unit of a prediction block. Using a luma prediction block as an example of a prediction block, the prediction block includes a matrix of values (e.g., luma values) for pixels, such as 8×8 pixels, 16×16 pixels, 8×16 pixels, 16×8 pixels, and the like.

Figure 6:
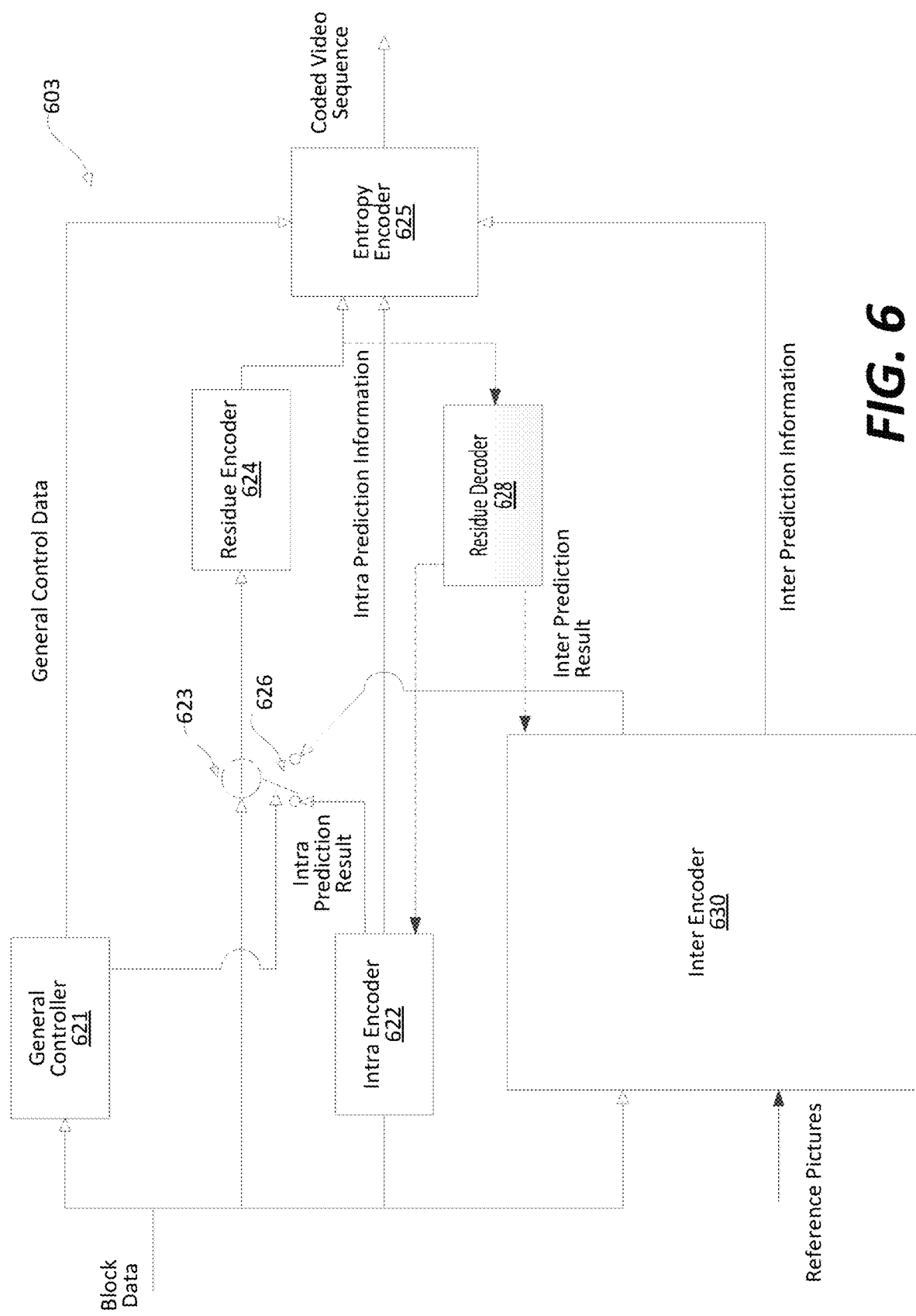
FIG. 6 shows a block diagram of an encoder in accordance with another embodiment.

FIG. 6 shows a diagram of a video encoder (603) according to another embodiment of the disclosure. The video encoder (603) is configured to receive a processing block (e.g., a prediction block) of sample values within a current video picture in a sequence of video pictures, and encode the processing block into a coded picture that is part of a coded video sequence. In an example, the video encoder (603) is used in the place of the video encoder (303) in the FIG. 3 example.

In an HEVC example, the video encoder (603) receives a matrix of sample values for a processing block, such as a prediction block of 8×8 samples, and the like. The video encoder (603) determines whether the processing block is best coded using intra mode, inter mode, or bi-prediction mode using, for example, rate-distortion optimization. When the processing block is to be coded in intra mode, the video encoder (603) may use an intra prediction technique to encode the processing block into the coded picture; and when the processing block is to be coded in inter mode or bi-prediction mode, the video encoder (603) may use an inter prediction or bi-prediction technique, respectively, to encode the processing block into the coded picture. In certain video coding technologies, merge mode can be an inter picture prediction submode where the motion vector is derived from one or more motion vector predictors without the benefit of a coded motion vector component outside the predictors. In certain other video coding technologies, a motion vector component applicable to the subject block may be present. In an example, the video encoder (603) includes other components, such as a mode decision module (not shown) to determine the mode of the processing blocks.

In the FIG. 6 example, the video encoder (603) includes the inter encoder (630), an intra encoder (622), a residue calculator (623), a switch (626), a residue encoder (624), a general controller, (621) and an entropy encoder (625) coupled together as shown in FIG. 6.

The inter encoder (630) is configured to receive the samples of the current block (e.g., a processing block), compare the block to one or more reference blocks in reference pictures (e.g., blocks in previous pictures and later pictures), generate inter prediction information (e.g., description of redundant information according to inter encoding technique, motion vectors, merge mode information), and calculate inter prediction results (e.g., predicted block) based on the inter prediction information using any suitable technique. In some examples, the reference pictures are decoded reference pictures that are decoded based on the encoded video information.

The intra encoder (622) is configured to receive the samples of the current block (e.g., a processing block), in some cases compare the block to blocks already coded in the same picture, generate quantized coefficients after transform, and in some cases also intra prediction information (e.g., an intra prediction direction information according to one or more intra encoding techniques). In an example, the intra encoder (622) also calculates intra prediction results (e.g., predicted block) based on the intra prediction information and reference blocks in the same picture.

The general controller (621) is configured to determine general control data and control other components of the video encoder (603) based on the general control data. In an example, the general controller (621) determines the mode of the block, and provides a control signal to the switch (626) based on the mode. For example, when the mode is the intra mode, the general controller (621) controls the switch (626) to select the intra mode result for use by the residue calculator (623), and controls the entropy encoder (625) to select the intra prediction information and include the intra prediction information in the bitstream; and when the mode is the inter mode, the general controller (621) controls the switch (626) to select the inter prediction result for use by the residue calculator (623), and controls the entropy encoder (625) to select the inter prediction information and include the inter prediction information in the bitstream.

The residue calculator (623) is configured to calculate a difference (residue data) between the received block and prediction results selected from the intra encoder (622) or the inter encoder (630). The residue encoder (624) is configured to operate based on the residue data to encode the residue data to generate the transform coefficients. In an example, the residue encoder (624) is configured to convert the residue data from a spatial domain to a frequency domain, and generate the transform coefficients. The transform coefficients are then subject to quantization processing to obtain quantized transform coefficients. In various embodiments, the video encoder (603) also includes a residue decoder (628). The residue decoder (628) is configured to perform inverse-transform, and generate the decoded residue data. The decoded residue data can be suitably used by the intra encoder (622) and the inter encoder (630). For example, the inter encoder (630) can generate decoded blocks based on the decoded residue data and inter prediction information, and the intra encoder (622) can generate decoded blocks based on the decoded residue data and the intra prediction information. The decoded blocks are suitably processed to generate decoded pictures and the decoded pictures can be buffered in a memory circuit (not shown) and used as reference pictures in some examples.

The entropy encoder (625) is configured to format the bitstream to include the encoded block. The entropy encoder (625) is configured to include various information according to a suitable standard, such as the HEVC standard. In an example, the entropy encoder (625) is configured to include the general control data, the selected prediction information (e.g., intra prediction information or inter prediction information), the residue information, and other suitable information in the bitstream. Note that, according to the disclosed subject matter, when coding a block in the merge submode of either inter mode or bi-prediction mode, there is no residue information.

Figure 7:
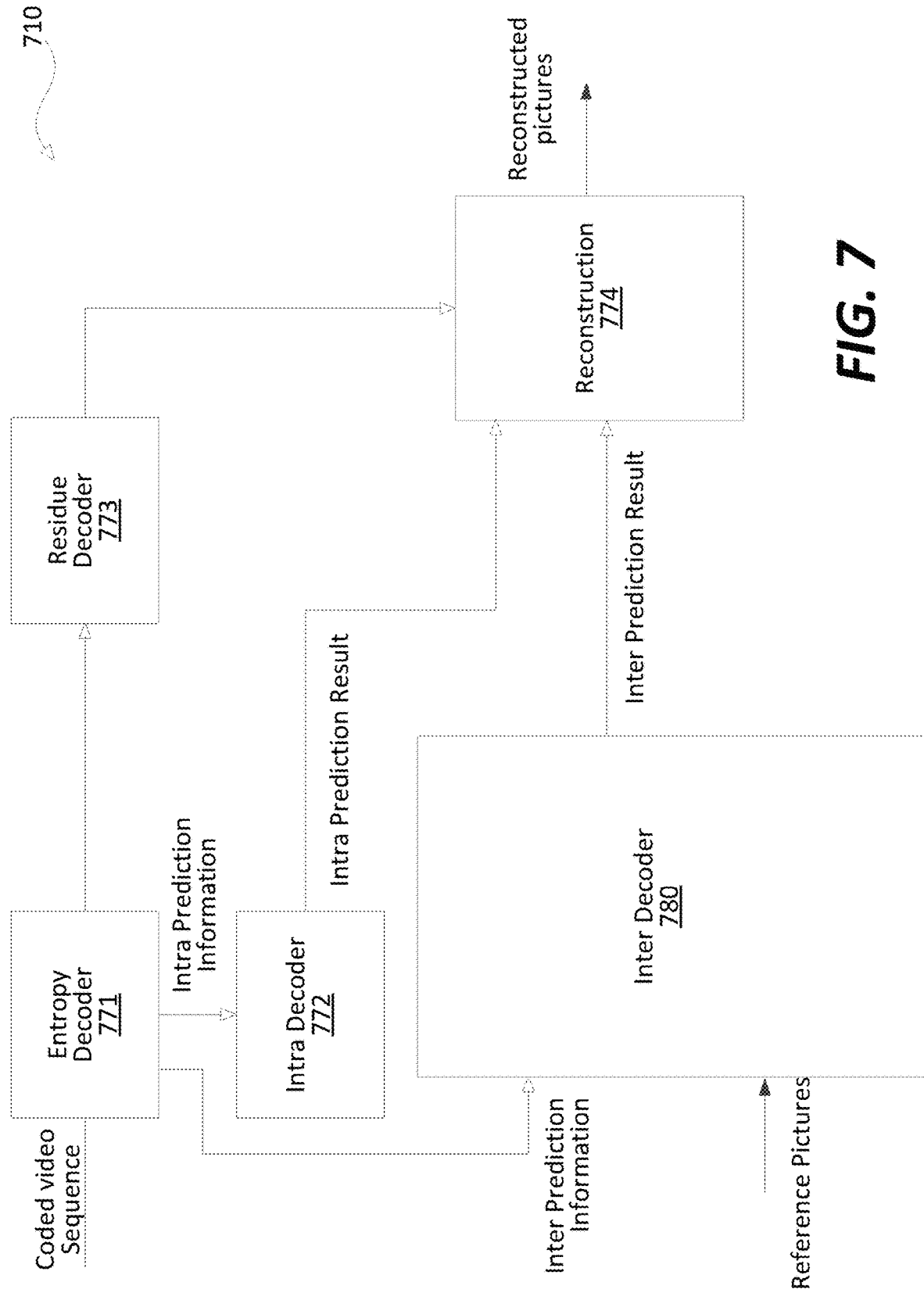
FIG. 7 shows a block diagram of a decoder in accordance with another embodiment.

FIG. 7 shows a diagram of a video decoder (710) according to another embodiment of the disclosure. The video decoder (710) is configured to receive coded pictures that are part of a coded video sequence, and decode the coded pictures to generate reconstructed pictures. In an example, the video decoder (710) is used in the place of the video decoder (310) in the FIG. 3 example.

In the FIG. 7 example, the video decoder (710) includes an entropy decoder (771), an inter decoder (780), a residue decoder (773), a reconstruction module (774), and an intra decoder (772) coupled together as shown in FIG. 7.

The entropy decoder (771) can be configured to reconstruct, from the coded picture, certain symbols that represent the syntax elements of which the coded picture is made up. Such symbols can include, for example, the mode in which a block is coded (such as, for example, intra mode, inter mode, bi-predicted mode, the latter two in merge submode or another submode), prediction information (such as, for example, intra prediction information or inter prediction information) that can identify certain sample or metadata that is used for prediction by the intra decoder (772) or the inter decoder (780), respectively, residual information in the form of, for example, quantized transform coefficients, and the like. In an example, when the prediction mode is inter or bi-predicted mode, the inter prediction information is provided to the inter decoder (780); and when the prediction type is the intra prediction type, the intra prediction information is provided to the intra decoder (772). The residual information can be subject to inverse quantization and is provided to the residue decoder (773).

The inter decoder (780) is configured to receive the inter prediction information, and generate inter prediction results based on the inter prediction information.

The intra decoder (772) is configured to receive the intra prediction information, and generate prediction results based on the intra prediction information.

The residue decoder (773) is configured to perform inverse quantization to extract de-quantized transform coefficients, and process the de-quantized transform coefficients to convert the residual from the frequency domain to the spatial domain. The residue decoder (773) may also require certain control information (to include the Quantizer Parameter (QP)), and that information may be provided by the entropy decoder (771) (data path not depicted as this may be low volume control information only).

The reconstruction module (774) is configured to combine, in the spatial domain, the residual as output by the residue decoder (773) and the prediction results (as output by the inter or intra prediction modules as the case may be) to form a reconstructed block, that may be part of the reconstructed picture, which in turn may be part of the reconstructed video. It is noted that other suitable operations, such as a deblocking operation and the like, can be performed to improve the visual quality.

It is noted that the video encoders (303), (503), and (603), and the video decoders (310), (410), and (710) can be implemented using any suitable technique. In an embodiment, the video encoders (303), (503), and (603), and the video decoders (310), (410), and (710) can be implemented using one or more integrated circuits. In another embodiment, the video encoders (303), (503), and (503), and the video decoders (310), (410), and (710) can be implemented using one or more processors that execute software instructions.

In general, a picture in a sequence of video pictures can be partitioned into a plurality of CUs. In some embodiments, such as in the HEVC standard, samples in each of the CUs can be coded using the same prediction type, such as an inter prediction type, an intra prediction type, and the like. In some embodiments, such as in the VCC standard, samples in each of the CUs can have the same prediction information and transform information. According to aspects of the disclosure, a CU located at a picture boundary of the picture can include a valid region that is inside the picture and an invalid region that is outside the picture without being split further. Such a CU can be referred to as a partial CU (PCU) where the valid region of the CU is coded. In various embodiments, the invalid region is not coded. As described above, a CU can include one or more coding blocks (CBs) where a CB includes a 2D sample array of a single color component associated with the CU. Therefore, the above description can be applied to CBs.

For purposes of clarity, the description below is mainly directed to CUs and PCUs, and the description can be suitably adapted to respective CBs and PCBs.

A picture can be partitioned into a plurality of CUs using any suitable method. For example, according to the HEVC standard, a picture can be split into a plurality of CTUs. Further, a CTU can be split into CUs by using a quad-tree (QT) structure denoted as a coding tree to adapt to various local characteristics of the picture. The decision whether to code a picture area using an inter-picture prediction (also referred to as a temporal prediction or an inter prediction type), an intra-picture prediction (also referred to as a spatial prediction, or an intra-prediction type), and the like is made at the CU level. Each CU can be further split into one, two or four PUs according to a PU splitting type. Inside one PU, the same prediction process is applied and the same prediction information is transmitted to a decoder on a PU basis. After obtaining residual data or residual information by applying the prediction process based on the PU splitting type, the CU can be partitioned into TUs according to another quadtree structure similar to the coding tree for the CU. In an example, a transform is applied for each TU having the same transform information. The HEVC structure has multiple partition units including a CU, a PU, and a TU. Samples in a CU can have the same prediction type, samples in a PU can have the same prediction information, and samples in a TU can have same transform information. A CU or a TU has a square shape, while a PU can have a rectangular shape, which includes a square shape in some embodiment, for an inter-predicted block. In some examples, such as in the JEM standard, PUs having rectangular shapes can be used for an intra prediction.

According to the HEVC standard, an implicit QT split is applied to a CTU located at a picture boundary to recursively split the CTU into a plurality of CUs so that each CU is located inside the picture boundary.

In various embodiments, such as in the HEVC standard, a CTB, CB, PB, and a transform block (TB) can be used to specify, for example, 2D sample arrays of one color component associated with a respective CTU, CU, PU, and TU, respectively. Therefore, a CTU can include one or more CTBs, such as one luma CTB and two chroma CTBs. Similarly, a CU can include one or more CBs, such as one luma CB and two chroma CBs.

In addition to the block partitioning described above, FIG. 8 shows an example of a block partitioning structure according to an embodiment of the disclosure. The block partitioning structure uses a QT plus binary tree (BT), and can be referred to as a QTBT structure or a QTBT partitioning. Compared to the QT structure described above, the QTBT structure removes a separation of the CU, PU, and TU, and supports more flexibility for CU partition shapes. In the QTBT structure, a CTU is split using the QTBT structure into a plurality of CUs, and a CU can have a rectangular shape, which includes a square shape in some embodiments. In various embodiments, the CUs serve as units for prediction and transform, thus, samples in a CU can have the same prediction type, can be coded using the same prediction process, can have the same prediction information, and the same transform information.

Figure 8:
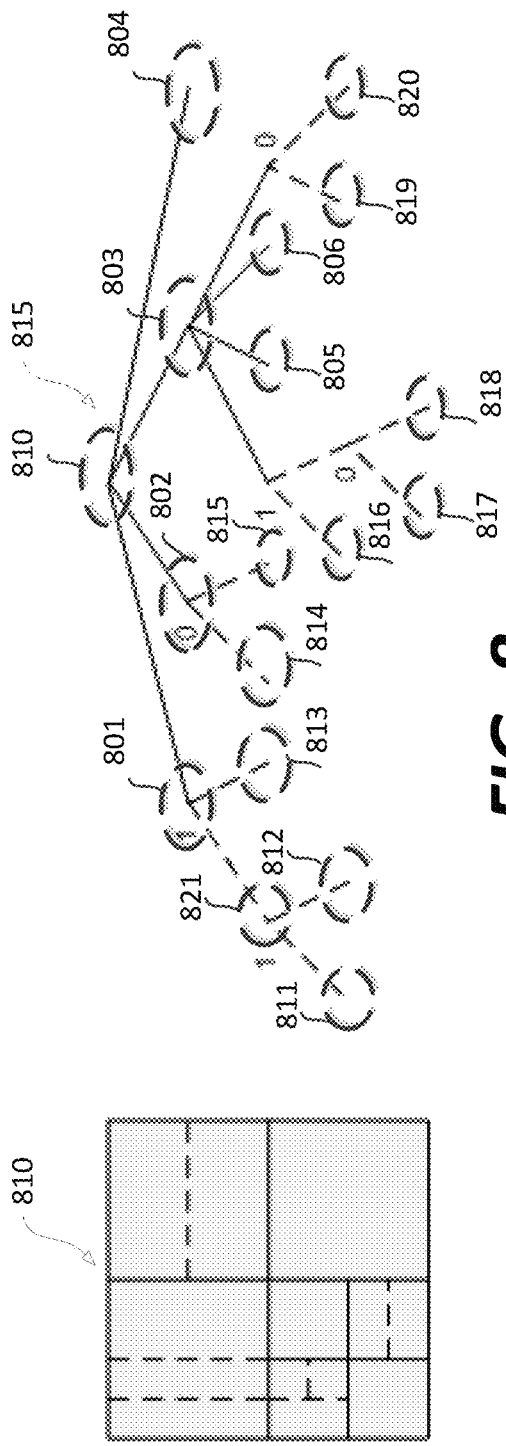
FIG. 8 shows an example of a block partitioning structure according to an embodiment of the disclosure.

FIG. 8 (left) illustrates an example of a block partitioning using a QTBT partitioning, and FIG. 8 (right) illustrates a corresponding QTBT tree representation (815). The solid lines indicate QT splits and dotted lines indicate BT splits. In each split (i.e., non-leaf) node of the binary tree, a flag is signaled to indicate a split type (i.e., a symmetric horizontal split or a symmetric vertical split) used. For example, "0" indicates the symmetric horizontal split and "1" indicates the symmetric vertical split. For a quadtree split, a split type is not indicated or signaled because the quadtree split splits a non-leaf node both horizontally and vertically to produce 4 smaller nodes with an equal size.

Referring to FIG. 8, a CTU (810) is first partitioned (or split) by a quadtree structure into nodes (801)-(804). The nodes (801)-(802) are further partitioned by a binary tree structure, respectively. As described above, a BT split includes two split types, i.e., the symmetric horizontal split and the symmetric vertical split. The quadtree node (803) is further partitioned by a combination of a BT structure and a QT structure. The node (804) is not further partitioned. Accordingly, binary tree leaf nodes (811)-(820) and quadtree leaf nodes (804)-(806) that are not split further are CUs used for prediction and transform processing. Thus, a CU, a PU, and a TU are identical in the QTBT structure. For example, samples in a CU have the same prediction type, the same prediction information, and the same transform information. In the QTBT partitioning, a CU can include CBs of different color components, e.g., one CU includes one luma CB and two chroma CBs in the case of P and B slices of the 4:2:0 chroma format. In some examples, a CU can include a CB of a single component, e.g., one CU includes one luma CB or two chroma CBs in the case of I slices.

The following parameters are defined for a QTBT partitioning. A CTU size refers to a root node size of a quadtree. For example, the root node or the CTU in the FIG. 8 example is (810). A MinQTSize refers to a minimum allowed quadtree leaf node size. A MaxBTSize refers to a maximum allowed binary tree root node size. For example, the node (801) is a binary tree root node in the FIG. 8 example. A MaxBTDepth refers to a maximum allowed binary tree depth. A MinBTSize refers to a minimum allowed binary tree leaf node size.

In one example of the QTBT partitioning, the CTU size is set as 128×128 luma samples with two corresponding 64×64 blocks of chroma samples, the MinQTSize is set as 16×16, the MaxBTSize is set as 64×64, the MinBTSize (for both width and height of a binary tree leaf node) is set as 4×4, and the MaxBTDepth is set as 4. The quadtree partitioning is applied to the CTU first to generate quadtree leaf nodes. The quadtree leaf nodes may have a size from 16×16 (i.e., the MinQTSize) to 128×128 (i.e., the CTU size). If the quadtree leaf node is 128×128, the quadtree leaf node is not further split by the binary tree since the size 128×128 exceeds the MaxBTSize (i.e., 64×64). Otherwise, the quadtree leaf node can be further partitioned by the binary tree. Therefore, the quadtree leaf node can be the root node for the binary tree and has the binary tree depth as 0. When the binary tree depth reaches the MaxBTDepth (i.e., 4), no further split is implemented. When the binary tree node has a width equal to the MinBTSize (i.e., 4), no further horizontal split is implemented. Similarly, when the binary tree node has a height equal to the MinBTSize, no further vertical split is implemented. The leaf nodes of the binary tree are further processed or coded by prediction and transform processing without any further partitioning. In the JEM standard, in some examples, the maximum CTU size is 256×256 luma samples.

In some examples, such as for P and B slices, the luma and chroma CTBs in one CTU share the same QTBT structure. On the other hand, the QTBT partitioning supports an ability for the luma and chroma to have a separate QTBT structure. For example, such as for I slices, the luma CTB is partitioned into luma CUs by a QTBT structure, and the chroma CTBs are partitioned into chroma CUs by another QTBT structure. Therefore, a CU in an I slice can include a CB of the luma component or CBs of two chroma components, and a CU in a P or B slice can include CBs of all three color components.

In some examples, such as in the HEVC standard, an inter prediction for small blocks is restricted to reduce memory access of motion compensation, such that bi-prediction is not supported for 4×8 and 8×4 blocks, and an inter prediction is not supported for 4×4 blocks. In some embodiments, such as in the QTBT implemented in the JEM standard, the above restrictions are removed.

Figure 9B:
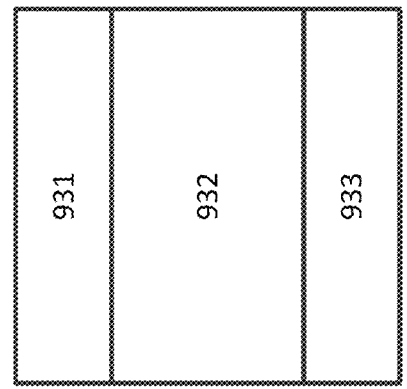
FIGS. 9A-9B show examples of a block partitioning according to embodiments of the disclosure.
Figure 9A:
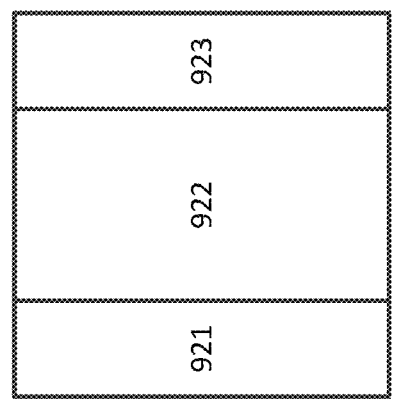

A multi-type-tree (MTT) structure can be a flexible tree structure. In the MTT, a horizontal and vertical center-side triple-tree (TTs) partitioning or split can be used, as shown in FIG. 9A-9B. The triple-tree partitioning can also be referred to as tertiary tree partitioning. FIG. 9A shows an example of a vertical center-side triple-tree partitioning. For example, an area (920) is vertically split into three sub-areas (921)-(923) where the sub-area (922) is located in the middle of the area (920). FIG. 9B shows an example of a horizontal center-side triple-tree partitioning. For example, an area (930) is horizontally split into three smaller sub-areas (931)-(933) where the sub-area (932) is located in the middle of the area (930). In various examples, the areas (920) and (930) can be CTUs or CUs, nodes that can be further split such as the node (801). One or more of the sub-areas (921)-(923) and (931)-(933) can be CUs that are not partitioned further or nodes that can be subsequently partitioned.

The TT partitioning is complementary to the QT split and the BT split. The TT partitioning can capture objects that are located in a center region of an area to be split, while the quad-tree and the binary-tree split in the center region. In various embodiments, a width and a height of the TT partitions are powers of 2 so that no additional non-power-of-two transforms are needed.

A design of a two-level tree is motivated by a complexity reduction. In some embodiments, a complexity of traversing of a tree is $T^D$, where T denotes a number of split types, and D is the depth of the split tree.

In some embodiments, a generalized binary splitting, such as a binary tree with shifting (BTS) partitioning or split can be used. In an example, an area is split into two rectangular sub-areas horizontally or vertically, and both a width and a height (in luma samples) of CUs due to the BTS split are integer multiples of 4. When a parameter dimension represents a width (for vertical splits) or a height (for horizontal splits), in luma samples, of the area to be split, the following splits shown in FIGS. 10A-10B can be implemented for both the horizontal and vertical splits.

Figure 10A:
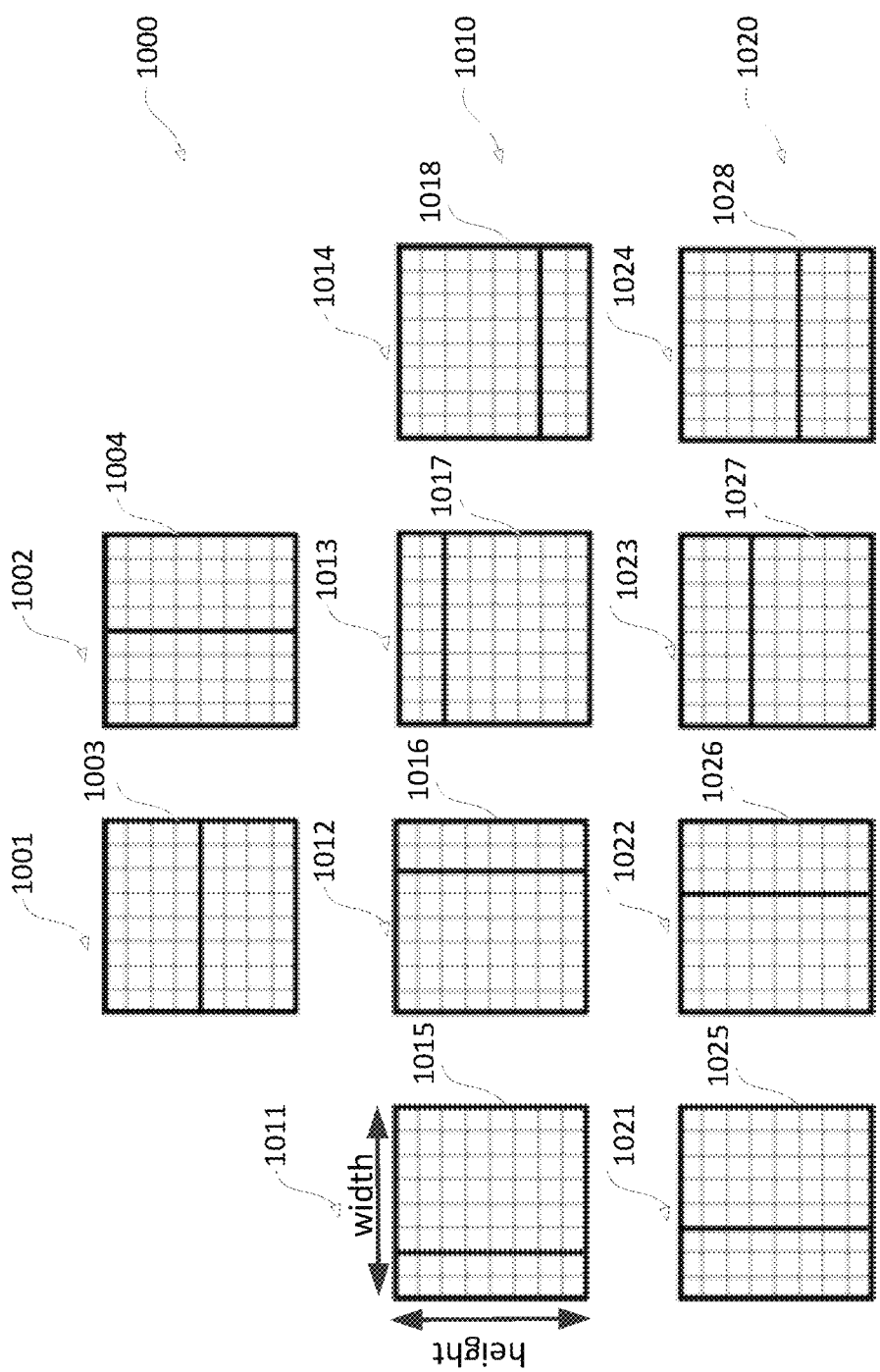
FIGS. 10A-10B show examples of a block partitioning according to embodiments of the disclosure.

Row (1000) in FIG. 10A shows examples of ½ splits (1001)-(1002). The ½ split (1001) shows that an area (1003) is split horizontally in the middle of the area (1003), similar to the symmetric horizontal split of the BT split. The ½ split (1002) shows that an area (1004) is split vertically in the middle of the area (1004), similar to the symmetric vertical split described above. The ½ split can be implemented when a dimension greater than or equal to k−8 and k is any suitable positive integer.

Row (1010) in FIG. 10A shows examples of ¼ and ¾ splits (1011)-(1014). The ¼ split (1011) shows that an area (1015) is split vertically along a ¼ position of a width of the area (1015). The ¾ split (1012) shows that an area (1016) is split vertically along a ¾ position of a width of the area (1016). The ¼ split (1013) shows that an area (1017) is split horizontally along a ¼ position of a height of the area (1017). The ¾ split (1014) shows that an area (1018) is split horizontally along a ¾ position of a height of the area (1018). The ¼ and ¾ splits can be implemented when a dimension is an integer power of two (i.e., the dimension=$2^n$, where n is any suitable positive integer) and the dimension is greater than or equal to 16.

Row (1020) in FIG. 10A shows examples of ⅜ and ⅝ splits (1021)-(1024).

The ⅜ split (1021) shows that an area (1025) is split vertically along a ⅜ position of a width of the area (1025). The ⅝ split (1022) shows that an area (1026) is split vertically along a ⅝ position of a width of the area (1026). The ⅜ split (1023) shows that an area (1027) is split horizontally along a ⅜ position of a height of the area (1027). The ⅝ split (1024) shows that an area (1028) is split horizontally along a ⅝ position of a height of the area (1028). The ⅜ and ⅝ splits can be implemented when a dimension is an integer power of two (i.e., the dimension=$2^n$, where n is any suitable positive integer) and the dimension is greater than equal to 32.

Figure 10B:
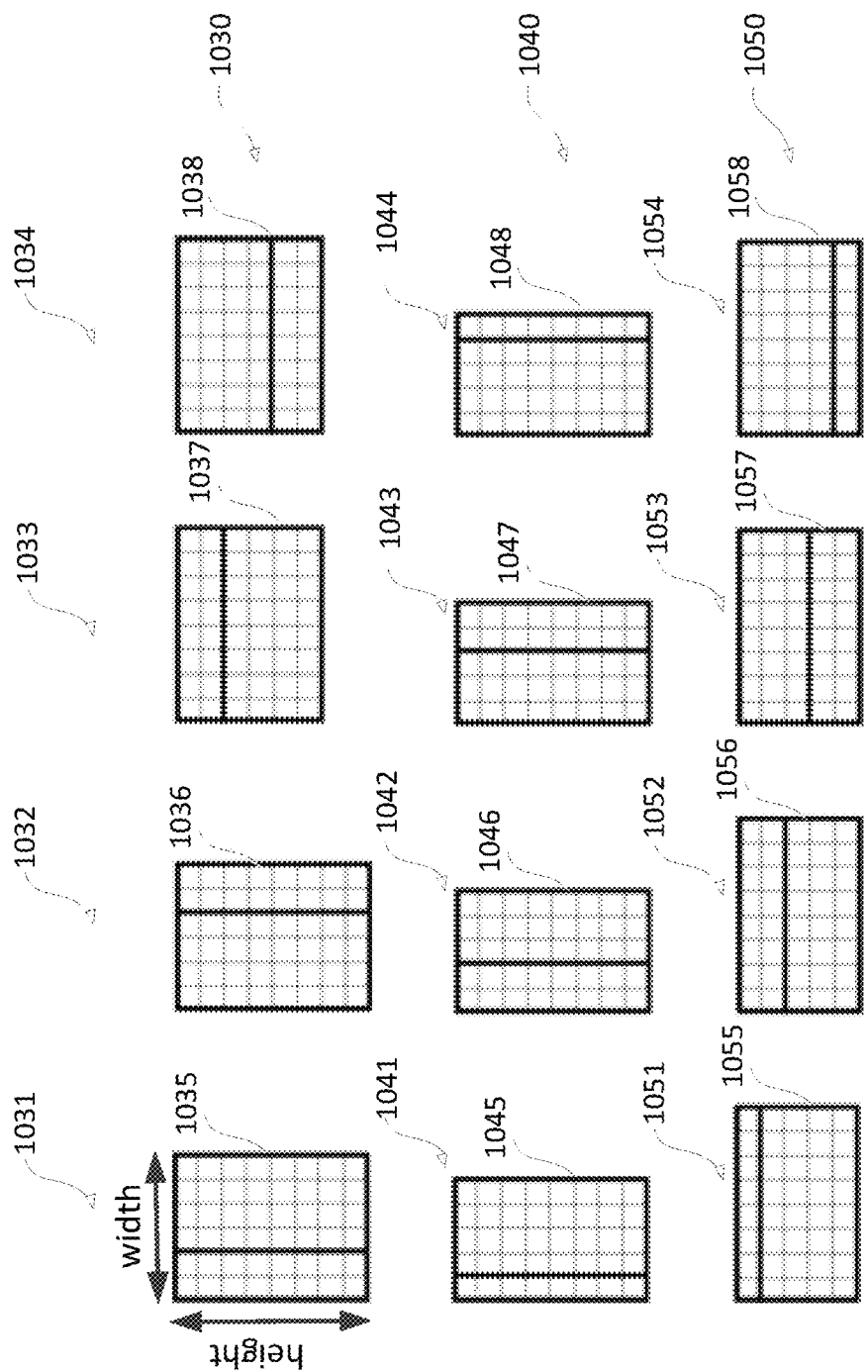

Row (1030) in FIG. 10B shows examples of ⅓ and ⅔ splits (1031)-(1034). The ⅓ split (1031) shows that an area (1035) is split vertically along a ⅓ position of a width of the area (1035). The ⅔ split (1032) shows that an area (1036) is split vertically along a ⅔ position of a width of the area (1036). The ⅓ split (1033) shows that an area (1037) is split horizontally along a ⅓ position of a height of the area (1037). The ⅔ split (1034) shows that an area (1038) is split horizontally along a ⅔ position of a height of the area (1038). The ⅓ and ⅔ splits can be implemented when a dimension is also a multiple of 3 (i.e., the dimension=$3 \times 2^n$, where n is any suitable positive integer) and the dimension is greater than or equal to 12.

Rows (1040) and (1050) in FIG. 10B show examples of ⅕ splits, ⅖ splits, ⅗ splits, and ⅘ splits, (1041)-(1044) and (1051)-(1054), respectively. The ⅕ split (1041) shows that an area (1045) is split vertically along a ⅕ position of a width of the area (1045). The ⅖ split (1042) shows that an area (1046) is split vertically along a ⅖ position of a width of the area (1046). The ⅗ split (1043) shows that an area (1047) is split vertically along a ⅗ position of a width of the area (1047). The ⅘ split (1044) shows that an area (1048) is split vertically along a ⅘ position of a width of the area (1048).

The ⅕ split (1051) shows that an area (1055) is split horizontally along a ⅕ position of a height of the area (1055). The ⅖ split (1052) shows that an area (1056) is split horizontally along a ⅖ position of a height of the area (1056). The ⅗ split (1053) shows that an area (1057) is split horizontally along a ⅗ position of a height of the area (1057). The ⅘ split (1054) shows that an area (1058) is split horizontally along a ⅘ position of a height of the area (1058). The ⅕ splits, the ⅖ splits, the ⅗ splits, and the ⅘ splits can be implemented when a dimension is also a multiple of 5 (i.e., the dimension=5×2$^n$, where n is any suitable positive integer) and the dimension is greater than or equal to 20.

As described above with reference to FIGS. 10A-10B, a BTS split can be specified using a split ratio n/m, where n/m can be ½, ¼, ¾, ⅜, ⅝, ⅓, ⅔, ⅕, ⅖, ⅗, ⅘, or the like. In an n/m horizontal split, an area having a first height m is split into two sub-areas, a top sub-area having a second height n and a bottom sub-area, thus a split ratio of the second height n over the first height m is n/m. Similarly, in an n/m vertical split, an area having a first width m is split into two sub-areas, a left sub-area having a second width n and a right sub-area. A split ratio of the second width n over the first width m is n/m. In some examples, when a size of a side (a width in a vertical split or a height in a horizontal split) to be split is not equal to 2$^n$, where n is a suitable positive integer, the size can be one of: 3×2$^n$ and 5×2$^n$, where n is a suitable positive integer.

As described above, a BTS split can be specified by a split direction and a split ratio, such as the ¼ vertical split (1011) in FIG. 10A. A split direction of a current BTS can be coded with respect to a previous BTS instead of being signaled as a horizontal or a vertical split. Therefore, the split direction can be signaled as a perpendicular split or a parallel split. The perpendicular split indicates that the split direction of the current BTS is perpendicular to a split direction of the previous binary split. Similarly, the parallel split indicates that the split direction of the current BTS is parallel to the split direction of the previous split. Thus, the perpendicular split or the parallel split can be translated to a horizontal or vertical split based on the split direction of the previous split. At a root level such as for a CTU or a binary root node, no previous split is signaled, and thus, a first perpendicular split is a horizontal split, and a first parallel split is a vertical split. A binary flag, such as a perpend split flag, can be used to distinguish the two split directions: a perpendicular split and a parallel split. A split ratio describes a location of the BTS (see FIGS. 10A-10B). The split ratio can be coded using a binary decision tree. Both the split direction and the split ratio can be coded using context-based adaptive binary arithmetic coding (CABAC). In an example, counting of a binary tree depth starts with a first split that is not a perpendicular ½ split.

Figure 11:
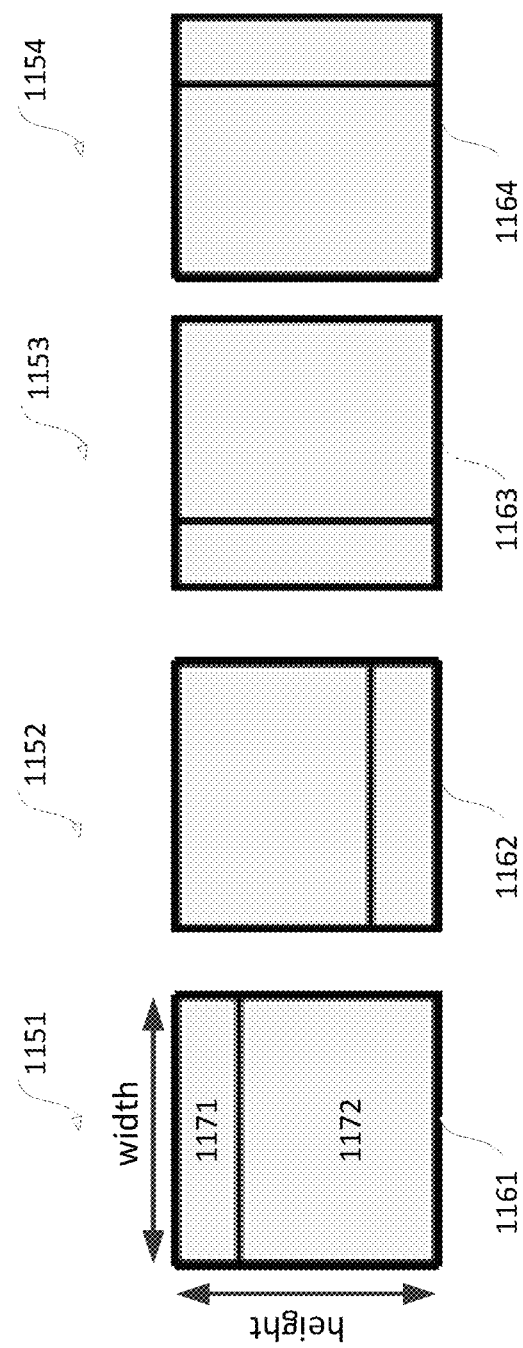
FIG. 11 shows examples of a block partitioning according to embodiments of the disclosure.

Further, an asymmetric binary tree (ABT) block partitioning structure can be used. Referring to FIG. 11, an area can be partitioned using a 1:3 or a 3:1 partition. For example, a 1:3 horizontal partition (1151) shows that an area (1161) is split horizontally along a ¼ position of a height of the area (1161) into a top sub-area (1171) and a bottom sub-area (1172). In the 1:3 horizontal partition, the ratio 1:3 is a ratio of a height of the top sub-area (1171) over a height of the bottom sub-area (1172). Similarly, a 3:1 horizontal partition (1152) shows that an area (1162) is split horizontally along a ¾ position of a height of the area (1162). A 1:3 vertical partition (1153) shows that an area (1163) is split vertically along a ¼ position of a width of the area (1163). A 3:1 vertical partition (1154) shows that an area (1164) is split vertically along a ¾ position of a width of the area (1164).

In various examples, when an area is split into two sub-areas using a BTS or an ABT, a width or a height of one of the two sub-areas may not be a power of 2.

A picture can be split into a plurality of CTUs. At a picture boundary, when a CTU includes areas both inside and outside of the picture, the CTU can be split into CUs such that each CU is located inside the picture. In some examples, such as in the HEVC standard, the CTU is split recursively using an implicit QT split, and thus, a split flag is not signaled. Alternatively, various non-QT splits can be suitably combined with the QT split to split the CTU into CUs that are located inside the picture. The non-QT splits refer to partitioning structures other than the QT split, and thus include a BT split, a TT split, a BTS split, an ABT split, and the like. Accordingly, a QT split can be combined with a BT split, a QT split can be combined with a BT split and a TT split, a QT split can be combined with a BT split and an ABT split, a QT split can be combined with a BTS split, and the like. At each split level, when both a QT split and a non-QT split are available at a picture boundary, one or more flags can be signaled to indicate a split type, and the like. In the examples described above, the CTU that includes areas both inside and outside of the picture is processed or coded as a plurality of CUs, and thus the CTU is not coded as a single coding unit.

FIG. 12A shows an example of CTUs that include areas outside a picture according to an embodiment of the disclosure. A picture (1200A) is partitioned into a plurality of CTUs (1211A)-(1215A), (1221A)-(1225A), (1231A)-(1235A), and (1241A)-(1245A). The CTUs (1211A)-(1214A), (1221A)-(1224A), and (1231A)-(1234A) are located inside the picture (1200A). Each of the CTUs (1215A), (1225A), (1235A), and (1241A)-(1245A), located at respective picture boundaries (1202) and/or (1204), includes a valid region that is inside the picture (1200A) and an invalid region that is outside the picture (1200A). For example, referring to FIGS. 12A and 12B, the CTU (1215A) includes a valid region (1215B) that is inside the picture (1200A) and an invalid region (1215C) that is outside the picture (1200A). Similarly, the CTU (1241A) includes a valid region (1241B) and an invalid region (1241C). In an example, the picture (1200A) can be partitioned into a plurality of CTUs using the encoder 503, such as in the source coder 530. In an example, a partition controller can be used to implement the partitioning process, and an output from the partition controller is sent to the source coder 530.

In general, whether a CTU includes a valid region and an invalid region can be determined based on a relative position between the CTU, such as the CTU (1225A), and the picture. Further, the relative position between the CTU (1225A) and the picture can be obtained based on a position of the picture, such as represented by a position of a top-left sample (1281), a size of the picture (such as a picture width (1284) and a picture height (1285)), a position of the CTU (1225A) (such as represented by a position of a top-left sample (1282)), and a size of the CTU (1225A) (such as a width (1283) when the CTU (1225A) is a square). Accordingly, the valid region inside the CTU (1225A) can be identified based on the relative position between the CTU (1225A) and the picture.

According to an embodiment of the disclosure, a CTU including a valid region inside a picture and an invalid region outside the picture can be processed or coded without being further split. Such a coding unit includes an invalid region and can be referred to as a PCU. As described above, PCU is a coding unit that includes a valid region and an invalid region, and is not further split. In various embodiments, the valid region in the PCU is coded, for example, the valid region is predicted and transformed. Accordingly, samples in the valid region of the PCU can have the same prediction type. Further, the samples in the valid region can be predicted using the same prediction process, have the same prediction information, and the same transform information. Referring to FIG. 12B, the CTU (1215A) is not further split, and is a PCU. The valid region (1215B) can be coded. In some examples, the invalid region (1215C) is not processed. A bin, such as a non-split flag, can be signaled to indicate that the CTU (1215A) is a PCU. The non-split flag can further imply that the valid region (1215B) is coded, and the invalid region (1215C) is not coded.

On the other hand, a CTU including a valid region inside a picture and an invalid region outside the picture can be partitioned into a plurality of CUs. When a CU of the plurality of CUs includes a valid region inside the picture and an invalid region that is outside the picture, according to an embodiment of the disclosure, the CU can be processed without being further split. Such a CU serves as a PCU. Referring to FIG. 12C, the CTU (1225A) includes a valid region and an invalid region. The CTU (1225A) is further partitioned, for example, using a ¼ horizontal split (i.e., a BTS split) into a first CU (1260) and a second CU (1270). The first CU (1260) includes a valid region (1261) and an invalid region (1262), and the second CU (1270) includes a valid region (1271) and an invalid region (1272). According to aspects of the disclosure, the first CU (1260) is processed without being further split, and the second CU (1270) is processed without being further split. Further, the valid region (1261) and the valid region (1271) are processed, and the invalid region (1262) and the invalid region (1272) are not processed. The first CU (1260) and the second CU (1270) are PCUs, respectively. In an example, a bin, such as a non-split flag, can be signaled to indicate that the first CU (1260) is a PCU. In an example, the non-split flag also implies that the valid region (1261) is processed, and the invalid region (1262) is not processed. In an embodiment, there is a minimum size constraint for CUs in the picture (1200A). For example, the minimum size constraint is implemented at a picture boundary, such as the picture boundary (1202) or (1204), and thus a CU such as the first CU (1260) cannot be further partitioned when a size of the first CU (1260) reaches the minimum size. Since a portion (i.e., the invalid region (1262)) of the first CU (1260) is outside the picture (1200A), the first CU (1260) is implied to be a PCU, and thus a bin, such as the non-split flag, does not need to be signaled. In another example, when the minimum size constraint is ignored, no PCUs are allowed at the picture boundary.

Figure 12D:
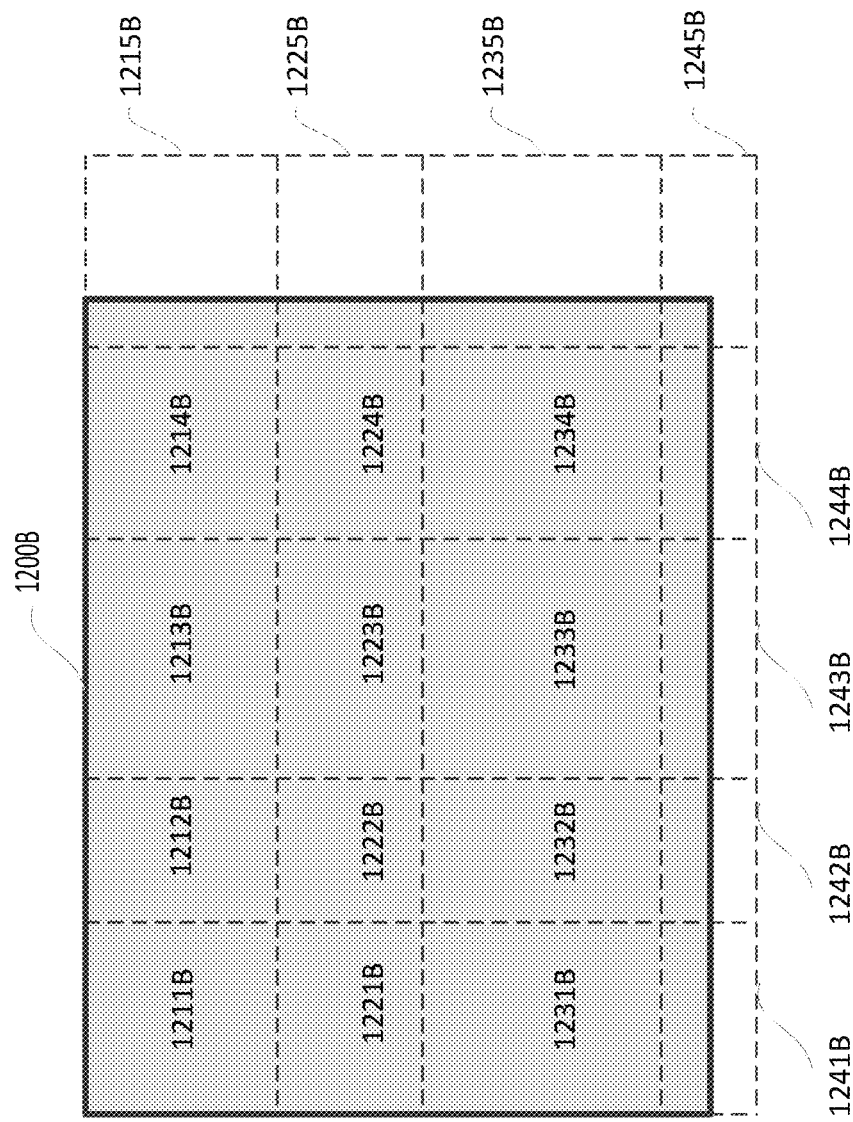
FIG. 12D shows an example where a picture is partitioned into a plurality of coding tree units according to an embodiment of the disclosure.

In general, a picture can be partitioned into CTUs having any suitable shapes and sizes. Shapes and sizes of the CTUs can be identical or different. FIG. 12A shows an example where each CTU has a square shape and the same size. FIG. 12D shows another example where a picture (1200B) is partitioned into a plurality of CTUs (1211B)-(1215B), (1221B-1225B), (1231B)-(1235B), and (1241B)-(1245B) that have square shapes and rectangular shapes, respectively. For example, the CTU (1215B) has a square shape, and the CTU (1225B) has a rectangular shape. As described above, the CTU (1225B) can be a PCU. Alternatively, the CTU (1225B) can be partitioned into smaller CUs, and one of the CUs can be a PCU.

Figures 13, 14:
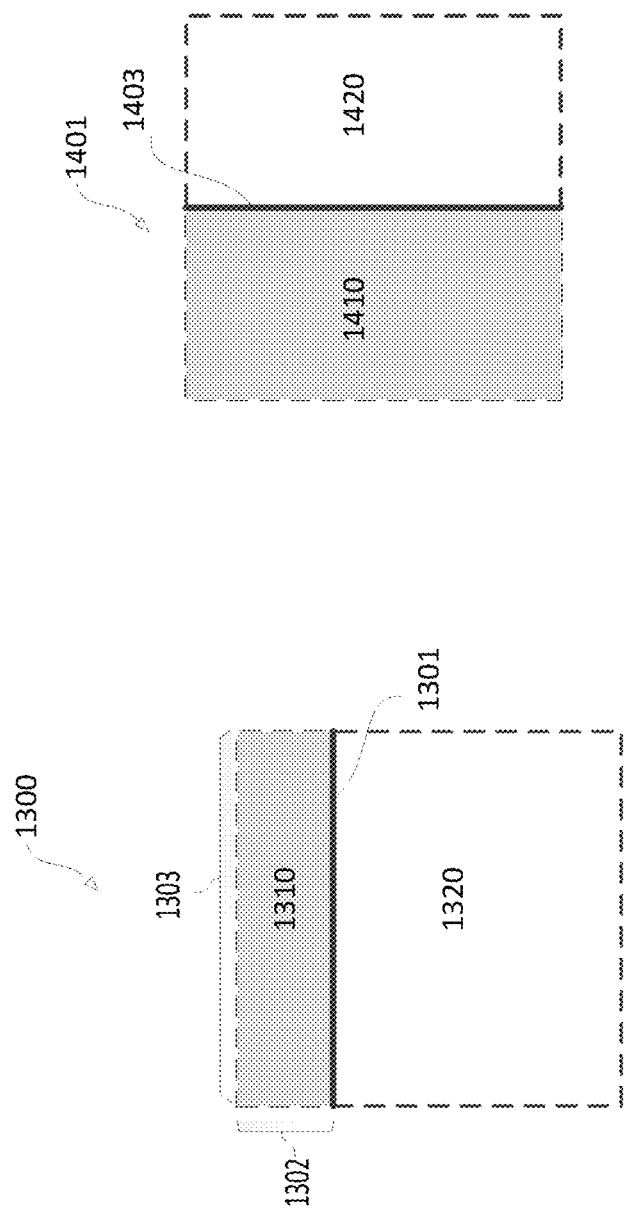
FIG. 13 shows an example of a partial coding unit according to an embodiment of the disclosure.
FIG. 14 shows an example where a partial coding unit is not used according to an embodiment of the disclosure.

FIG. 13 shows an example of a PCU (1300) according to an embodiment of the disclosure. The PCU (1300) associated with a picture includes a valid region (1310) that is inside the picture and an invalid region (1320) that is outside the picture. The valid region (1310) and the invalid region (1320) are separated by a picture boundary (1301). The PCU (1300) is not further split. The valid region (1310) can be coded with a single prediction type. Further, the valid region (1310) can be coded with the same prediction process having the same prediction information. The valid region (1310) can also have the same transform information. The valid region (1310) has a height (1302) and a width (1303).

According to aspects of the disclosure, when one of the height (1302) and the width (1303) is not a power of 2, for example, when the width (1303) is 12, or when the height (1302) is 6, a skip mode is used for predicting the valid region (1310). Residual data between predictions and samples of the valid region (1310) is regarded as zero and is not transmitted, and a non-power-of-2 transform is disabled. According to aspects of the disclosure, a skip flag is implied and thus not signaled when one of the width (1303) and the height (1302) of the PCU (1300) is not a power of 2. Alternatively, when one of the width (1302) and the height (1303) is not a power of 2, any suitable prediction mode, such as an inter-prediction mode, an intra-prediction mode, and the like, can be used for predicting the valid region (1310). Further, the residual data for the valid region (1310) is regarded as zero and is not transmitted, and the non-power-of-2 transform is disabled. Further, a flag can be signaled to indicate the prediction mode.

In general, a valid region of a PCU is not obtainable by a single split of the PCU by one of: a QT split and a BT split as described below. Under certain conditions, when a single split of an area including a valid region and an invalid region results in a CU that is identical to the valid region, the area is split and a PCU is not used, as shown in FIG. 14. An area (1401) includes a valid region (1410) that is inside a picture and an invalid region (1420) that is outside the picture. The valid region (1410) and the invalid region (1420) are separated by a picture boundary (1403). In the FIG. 14 example, a single partition or split, such as a BT split, can split the area (1401) into a first CU and a second CU where the first CU is the valid region (1410). Accordingly, the first CU or the valid region (1410) can be processed as a single CU. Therefore, a PCU is disabled, and the area (1401) is not a PCU. Further, a non-split flag is not signaled. A QT split or a BT split can be used to split the area 1401.

In some embodiments, a size and/or a shape of a PCU satisfy certain requirements. For example, a PCU is divisible into a number of rectangular sub-areas that have widths and heights being powers of 2, and the number of divisions to obtain the rectangular sub-areas is less than a predetermined threshold. FIG. 15A shows an example of a PCU according to an embodiment of the disclosure. In this example, the predetermined threshold is 3. An area (1501) is located at a picture boundary (1502) of a picture. The area (1501) includes a valid region (1510) inside the picture and an invalid region (1512) outside the picture. The valid region (1510) and the invalid region (1512) are separated by the picture boundary (1502). Further, the area (1501) has a width (1525) of 12 and a height (1521) of 16. Accordingly, the area (1501) is divisible into 2 sub-areas by one division, such as a first sub-area (1522) having a size of 16 (height)×4 (width), and a second sub-area (1523) having a size of 16×8.

Both a width and a height of the first sub-area (1522) are powers of 2, and both a width and a height of the second sub-area (1523) are powers of 2. Therefore, the area (1501) can be a PCU without being further split.

In general, the predetermined threshold can be any suitable positive integer, such as 2, 3, 4, and the like. Further, the area (1501) can be divided differently, as shown in FIG. 15B. The area 1501 is divisible into a third sub-area (1532) having a size of 16×8 and a fourth sub-area (1533) having a size of 16×4. Both a width and a height of the third sub-area (1532) are powers of 2, and both a width and a height of the fourth sub-area (1533) are powers of 2. Therefore, the area (1501) can be a PCU without being further split.

FIG. 15C shows an example of an area that does not satisfy the above requirement, and thus is not a PCU. An area (1541) of 28×32 is located at a picture boundary (1542) of a picture. The area (1541) includes a valid region (1543) inside the picture and an invalid region (1544) outside the picture that are separated by the picture boundary (1542). Further, the area (1541) has a width (1555) of 28 and a height (1551) of 32. Accordingly, the area (1541) is not divisible into 2 sub-areas where each of the two sub-areas has a width and a height of powers of 2. Therefore, when the pre-determined threshold is 2, the area (1541) is not a PCU, and thus is further split into smaller CUs. Accordingly, the PCU is disabled for the area (1541), and thus, a non-split flag is not signaled.

Figure 16:
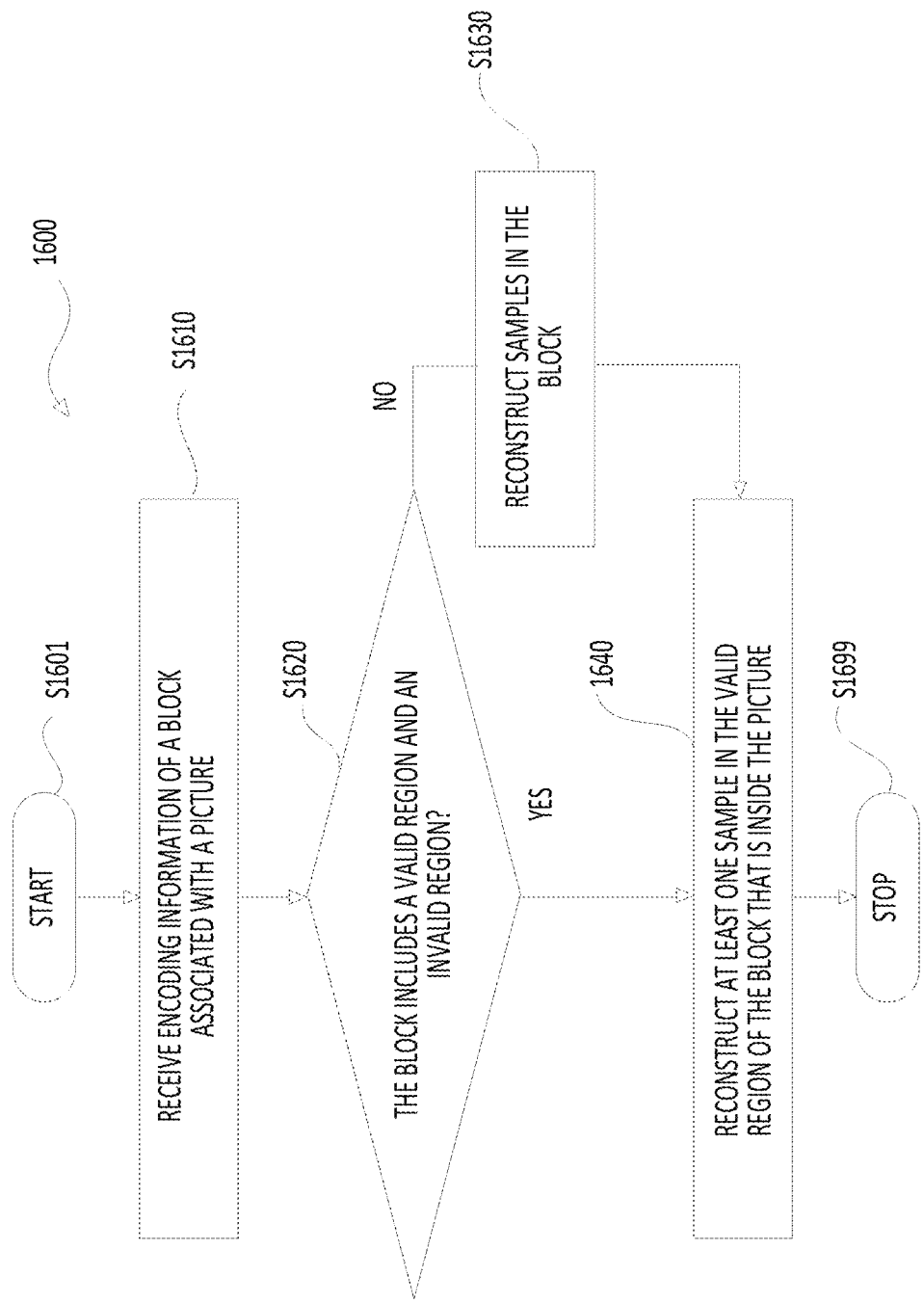
FIG. 16 shows a decoding process according to one embodiment of the disclosure.
Figure 17:
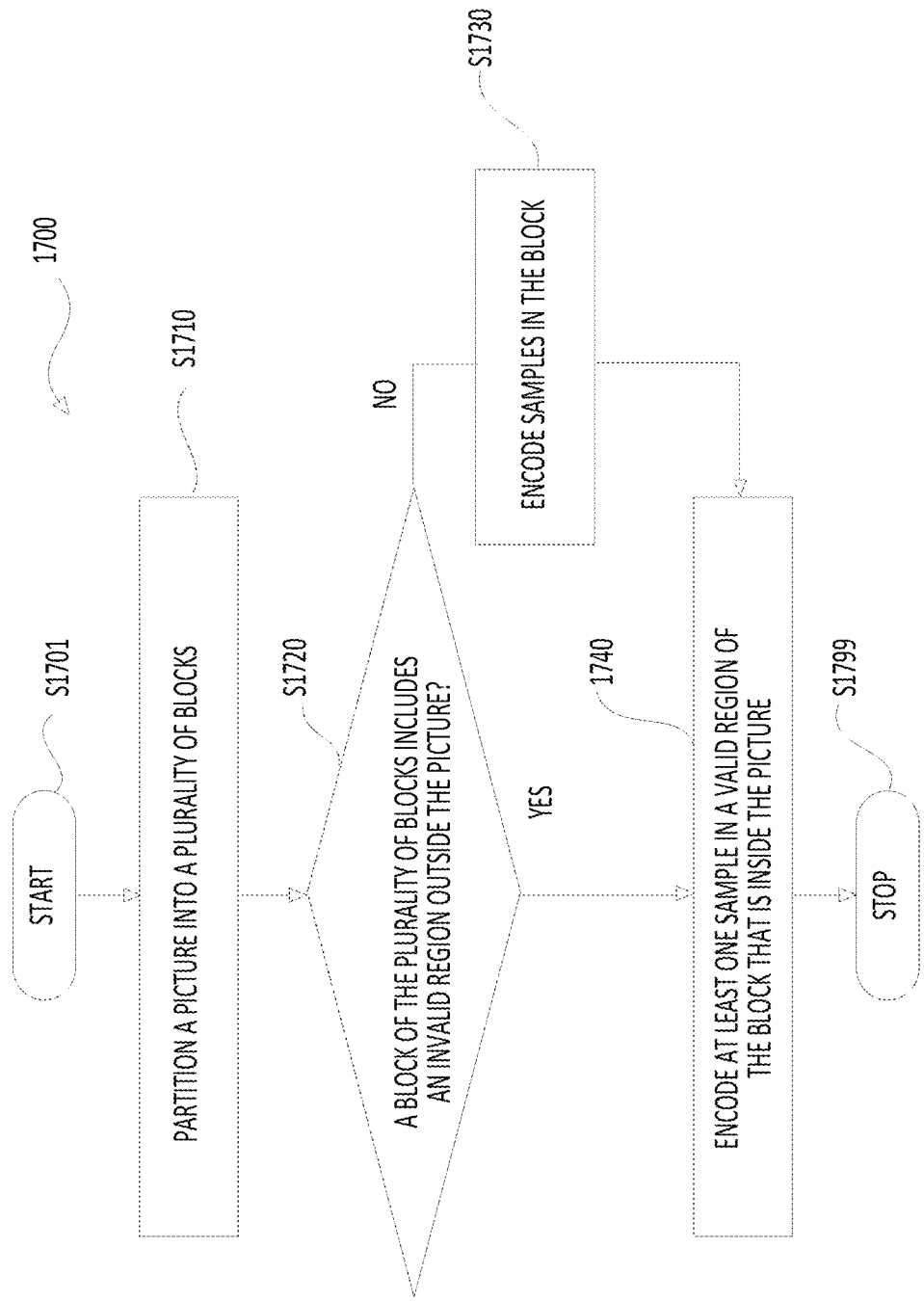
FIG. 17 shows an encoding process according to one embodiment of the disclosure.

FIGS. 16-17 show flow charts outlining processes 1600 and 1700, respectively, according to embodiments of the disclosure. The process 1600 can be used in the reconstruction of a block including a partial coding block. The process 1700 can be used to partition a picture into coding blocks having a partial coding block and encoding the partial coding block. In various embodiments, the processes (1600) and (1700) are executed by suitable processing circuitry, such as the processing circuitry in the terminal devices (210), (220), (230), and (240), the processing circuitry that performs functions of the video encoder (303), the processing circuitry that performs functions of the video decoder (310), the processing circuitry that performs functions of the video decoder (410), the processing circuitry that performs functions of the intra prediction module (452), the processing circuitry that performs functions of the video encoder (503), the processing circuitry that performs functions of the predictor (535), the processing circuitry that performs functions of the intra encoder (622), the processing circuitry that performs functions of the decoder (710), the processing circuitry that performs functions of the intra decoder (772), the processing circuitry that performs functions of the inter decoder (780), the processing circuitry that performs functions of the intra decoder (772), the processing circuitry that performs functions of the reconstruction (774), and the like. In some embodiments, the processes (1600) and/or (1700) can be implemented in software instructions, thus when the processing circuitry executes the software instructions, the processing circuitry performs the processes (1600) and/or (1700).

FIG. 16 illustrates a decoding process according to one embodiment. The process (1600) starts at (S1601) and proceeds to (S1610). At (S1610), encoding information of a block associated with a picture in a coded video bitstream is received. In an example, the encoding information can include splitting information such as a non-split flag, a QT flag, a non-QT flag, a BT flag, or the like that is signaled in the coded bitstream. The block can be a luma coding block, a chroma coding block, or the like. The block can have any suitable shape, size, and the like. The block can have a rectangular shape. In some examples, the block has a square shape.

At (S1620), whether the block includes a valid region inside the picture and an invalid region outside the picture is determined based on the encoding information. In an example, when the encoding information includes splitting information (e.g., a non-split flag), the block is determined to include the valid region and the invalid region, and is a partial coding block. When the encoding information includes a QT split flag, the block is determined to include the valid region and not include the invalid region.

In an embodiment, characteristics of the block including a size, a shape, a position, a relative position of the block with respect to the picture, and the like can be obtained based on the encoding information. For example, the relative position of the block with respect to the picture indicates implicitly that the block includes the invalid region. When the block is determined to include the valid region and the invalid region, the process (1600) proceeds to (S1640). Otherwise, the process (1600) proceeds to (S1630).

At (S1630), samples in the block are reconstructed, for example, based on a suitable video coding technology and/or a video coding standard, such as the HEVC standard, the VVC standard, and the like. The process proceeds to (S1699), and terminates.

At (S1640), at least one sample in the valid region of the block that is inside the picture is reconstructed. In various embodiments, only samples in the valid region are reconstructed and the samples includes the at least one sample. In an embodiment, the at least one sample in the valid region is reconstructed using the same prediction type, such as an inter-prediction type, an intra-prediction type, or the like. Further, the at least one sample in the valid region can be reconstructed using the same prediction information and the same transform information.

In an embodiment, at least one prediction for the at least one sample in the valid region is generated using the same prediction information. At least one piece of residual data indicating a difference between the at least one prediction and at least a value of the at least one sample is obtained using the same transform information. Subsequently, the at least one sample is reconstructed based on the at least one prediction and the at least one piece of residual data. Under certain conditions, when the valid region has a rectangular shape with a width and a height, and one of the width and the height is not a power of 2, the at least one sample is reconstructed based on the at least one prediction without residual data. When the one of the width and the height is not a power of 2, the at least one sample can be reconstructed using a skip mode, an intra-prediction mode, an inter-prediction mode, or the like. The process proceeds to S1699, and terminates.

FIG. 17 illustrates an encoding process according to one embodiment. The process 1700 starts at (S1701) and proceeds to (S1710). At (S1710), a picture to be encoded is partitioned into a plurality of blocks. A block can be a luma coding block, a chroma coding block, or the like. The picture can be partitioned into the plurality of blocks using any suitable partitioning structure described above, such as a QT split, a QTBT split, a BT split, a TT split, a BTS split, a ABT split, and a combination thereof. In an embodiment, the picture is divided into CTBs, as described in FIGS. 12A and 12D, and one or more CTBs are further split into CBs using one or more partitioning structures as described above with reference to FIGS. 8-12D. The CTBs can have any suitable shape and sizes, such as a rectangular shape, and the like, as described in FIGS. 12A and 12D. In some examples, the CTBs can have a square shape. In an example, (S1710) can be implemented using the encoder (503), such as in the source coder (530). In an example, a partition controller can be used to implement (S1710), and the plurality of blocks is sent to the source coder (530).

At (S1720), whether a block of the plurality of blocks includes an invalid region that is outside the picture is determined, for example, based on a relative position of the block with respect to the picture, as described with reference to FIG. 12A.

When the block is determined to include the invalid region that is outside the picture, the process (1700) proceeds to (S1740). Otherwise, the process (1700) proceeds to (S1730).

At (S1730), samples in the block are encoded, for example, based on a suitable video coding technology and/or a video coding standard, such as the HEVC standard, the VVC standard, and the like. The process proceeds to (S1799), and terminates.

At (S1740), at least one sample in the valid region of the block that is inside the picture is encoded. In various embodiments, only samples in the valid region of the block are encoded and the samples include the at least one sample. The at least one sample in the valid region can be predicted by the same prediction type, such as an inter-prediction type, an intra-prediction type, or the like. Further, the at least one sample in the valid region can have the same prediction information and the same transform information. In an example, splitting information in the form of a flag, such as a non-split flag, can be signaled to indicate that the block is not further split, and is encoded as a partial coding block. In an example, the non-split flag, or any other form of splitting information, is not signaled. Instead, a relative position of the picture and the block can indicate that the block is a partial coding block. In an embodiment, at least one prediction for the at least one sample in the valid region is generated using the same prediction information. At least one piece of residual data for the at least one sample is obtained using the same transform information where the at least one piece of residual data indicates a difference between the at least one prediction and at least one value of the at least one sample. Subsequently, the at least one prediction and the at least one piece of residual data associated with the at least one sample are encoded. In an example, the valid region has a rectangular shape with a width and a height, and one of the width and the height is not a power of 2, and thus, the residual data is regarded as zero and not transmitted. When the one of the width and the height is not a power of 2, the at least one sample can be encoded using a skip mode, an intra-prediction mode, an inter-prediction mode, and the like. The process proceeds to (S1799), and terminates.

The techniques described above, can be implemented as computer software using computer-readable instructions and physically stored in one or more computer-readable media. For example, FIG. 18 shows a computer system (1800) suitable for implementing certain embodiments of the disclosed subject matter.

The computer software can be coded using any suitable machine code or computer language, that may be subject to assembly, compilation, linking, or like mechanisms to create code comprising instructions that can be executed directly, or through interpretation, micro-code execution, and the like, by one or more computer central processing units (CPUs), Graphics Processing Units (GPUs), and the like.

The instructions can be executed on various types of computers or components thereof, including, for example, personal computers, tablet computers, servers, smartphones, gaming devices, internet of things devices, and the like.

Figure 18:
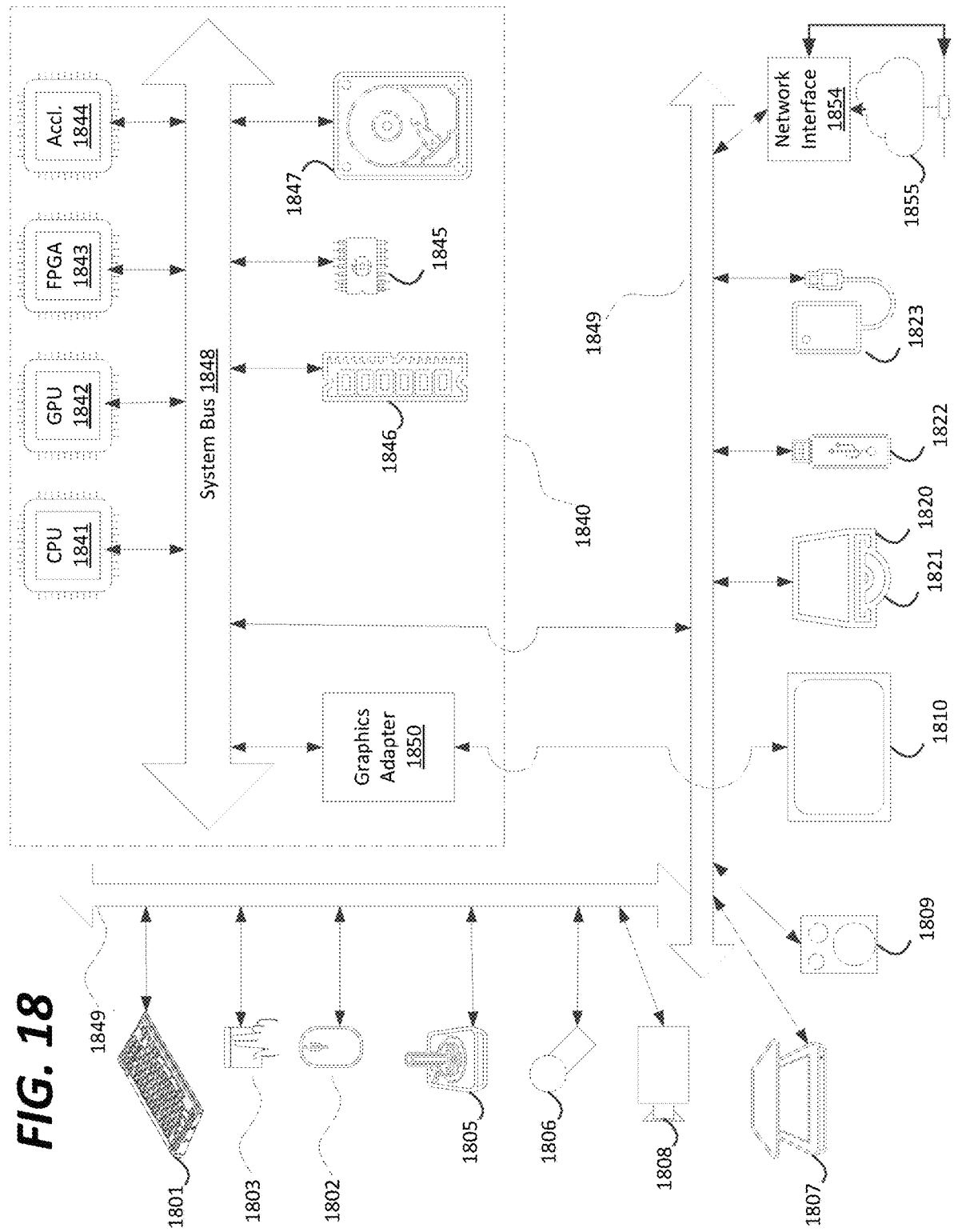
FIG. 18 is a schematic illustration of a computer system in accordance with an embodiment.

The components shown in FIG. 18 for the computer system (1800) are exemplary in nature and are not intended to suggest any limitation as to the scope of use or functionality of the computer software implementing embodiments of the present disclosure. Neither should the configuration of components be interpreted as having any dependency or requirement relating to any one or combination of components illustrated in the exemplary embodiment of a computer system (1800).

Computer system (1800) may include certain human interface input devices. Such a human interface input device may be responsive to input by one or more human users through, for example, tactile input (such as: keystrokes, swipes, data glove movements), audio input (such as: voice, clapping), visual input (such as: gestures), olfactory input (not depicted). The human interface devices can also be used to capture certain media not necessarily directly related to conscious input by a human, such as audio (such as: speech, music, ambient sound), images (such as: scanned images, photographic images obtain from a still image camera), video (such as two-dimensional video, three-dimensional video including stereoscopic video).

Input human interface devices may include one or more of (only one of each depicted): keyboard (1801), mouse (1802), trackpad (1803), touch screen (1810), data-glove (not shown), joystick (1805), microphone (1806), scanner (1807), camera (1808).

Computer system (1800) may also include certain human interface output devices. Such human interface output devices may be stimulating the senses of one or more human users through, for example, tactile output, sound, light, and smell/taste. Such human interface output devices may include tactile output devices (for example tactile feedback by the touch-screen (1810), data-glove (not shown), or joystick (1805), but there can also be tactile feedback devices that do not serve as input devices), audio output devices (such as: speakers (1809), headphones (not depicted)), visual output devices (such as screens (1810) to include CRT screens, LCD screens, plasma screens, OLED screens, each with or without touch-screen input capability, each with or without tactile feedback capability some of which may be capable to output two dimensional visual output or more than three dimensional output through means such as stereographic output; virtual-reality glasses (not depicted), holographic displays and smoke tanks (not depicted)), and printers (not depicted).

Computer system (1800) can also include human accessible storage devices and their associated media such as optical media including CD/DVD ROM/RW (1820) with CD/DVD or the like media (1821), thumb-drive (1822), removable hard drive or solid state drive (1823), legacy magnetic media such as tape and floppy disc (not depicted), specialized ROM/ASIC/PLD based devices such as security dongles (not depicted), and the like.

Those skilled in the art should also understand that term "computer readable media" as used in connection with the presently disclosed subject matter does not encompass transmission media, carrier waves, or other transitory signals.

Computer system (1800) can also include an interface to one or more communication networks. Networks can for example be wireless, wireline, optical. Networks can further be local, wide-area, metropolitan, vehicular and industrial, real-time, delay-tolerant, and so on. Examples of networks include local area networks such as Ethernet, wireless LANs, cellular networks to include GSM, 3G, 4G, 5G, LTE and the like, TV wireline or wireless wide area digital networks to include cable TV, satellite TV, and terrestrial broadcast TV, vehicular and industrial to include CANBus, and so forth. Certain networks commonly require external network interface adapters that attached to certain general purpose data ports or peripheral buses (1849) (such as, for example USB ports of the computer system (1800)); others are commonly integrated into the core of the computer system (1800) by attachment to a system bus as described below (for example Ethernet interface into a PC computer system or cellular network interface into a smartphone computer system). Using any of these networks, computer system (1800) can communicate with other entities. Such communication can be uni-directional, receive only (for example, broadcast TV), uni-directional send-only (for example CANbus to certain CANbus devices), or bi-directional, for example to other computer systems using local or wide area digital networks. Certain protocols and protocol stacks can be used on each of those networks and network interfaces as described above.

Aforementioned human interface devices, human-accessible storage devices, and network interfaces can be attached to a core (1840) of the computer system (1800).

The core (1840) can include one or more Central Processing Units (CPU) (1841), Graphics Processing Units (GPU) (1842), specialized programmable processing units in the form of Field Programmable Gate Areas (FPGA) (1843), hardware accelerators for certain tasks (1844), and so forth. These devices, along with Read-only memory (ROM) (1845), Random-access memory (1846), internal mass storage such as internal non-user accessible hard drives, SSDs, and the like (1847), may be connected through a system bus (1848). In some computer systems, the system bus (1848) can be accessible in the form of one or more physical plugs to enable extensions by additional CPUs, GPU, and the like. The peripheral devices can be attached either directly to the core's system bus (1848), or through a peripheral bus (1849). Architectures for a peripheral bus include PCI, USB, and the like.

CPUs (1841), GPUs (1842), FPGAs (1843), and accelerators (1844) can execute certain instructions that, in combination, can make up the aforementioned computer code. That computer code can be stored in ROM (1845) or RAM (1846). Transitional data can be also be stored in RAM (1846), whereas permanent data can be stored for example, in the internal mass storage (1847). Fast storage and retrieve to any of the memory devices can be enabled through the use of cache memory, that can be closely associated with one or more CPU (1841), GPU (1842), mass storage (1847), ROM (1845), RAM (1846), and the like.

The computer readable media can have computer code thereon for performing various computer-implemented operations. The media and computer code can be those specially designed and constructed for the purposes of the present disclosure, or they can be of the kind well known and available to those having skill in the computer software arts.

As an example and not by way of limitation, the computer system having architecture (1800), and specifically the core (1840) can provide functionality as a result of processor(s) (including CPUs, GPUs, FPGA, accelerators, and the like) executing software embodied in one or more tangible, computer-readable media. Such computer-readable media can be media associated with user-accessible mass storage as introduced above, as well as certain storage of the core (1840) that are of non-transitory nature, such as core-internal mass storage (1847) or ROM (1845). The software implementing various embodiments of the present disclosure can be stored in such devices and executed by core (1840). A computer-readable medium can include one or more memory devices or chips, according to particular needs. The software can cause the core (1840) and specifically the processors therein (including CPU, GPU, FPGA, and the like) to execute particular processes or particular parts of particular processes described herein, including defining data structures stored in RAM (1846) and modifying such data structures according to the processes defined by the software. In addition or as an alternative, the computer system can provide functionality as a result of logic hardwired or otherwise embodied in a circuit (for example: accelerator (1844)), which can operate in place of or together with software to execute particular processes or particular parts of particular processes described herein. Reference to software can encompass logic, and vice versa, where appropriate. Reference to a computer-readable media can encompass a circuit (such as an integrated circuit (IC)) storing software for execution, a circuit embodying logic for execution, or both, where appropriate. The present disclosure encompasses any suitable combination of hardware and software.

APPENDIX A: ACRONYMS

JEM: joint exploration model
VVC: versatile video coding
BMS: benchmark set
MV: Motion Vector
HEVC: High Efficiency Video Coding
SEI: Supplementary Enhancement Information
VUI: Video Usability Information
GOPs: Groups of Pictures
TUs: Transform Units,
PUs: Prediction Units
CTUs: Coding Tree Units
CTBs: Coding Tree Blocks
PBs: Prediction Blocks
HRD: Hypothetical Reference Decoder
SNR: Signal Noise Ratio
CPUs: Central Processing Units
GPUs: Graphics Processing Units
CRT: Cathode Ray Tube
LCD: Liquid-Crystal Display
OLED: Organic Light-Emitting Diode
CD: Compact Disc
DVD: Digital Video Disc
ROM: Read-Only Memory
RAM: Random Access Memory
ASIC: Application-Specific Integrated Circuit
PLD: Programmable Logic Device
LAN: Local Area Network
GSM: Global System for Mobile communications
LTE: Long-Term Evolution
CANBus: Controller Area Network Bus
USB: Universal Serial Bus
PCI: Peripheral Component Interconnect
FPGA: Field Programmable Gate Areas
SSD: solid-state drive
IC: Integrated Circuit
CU: Coding Unit
QT: Quadtree While this disclosure has described several exemplary embodiments, there are alterations, permutations, and various substitute equivalents, which fall within the scope of the disclosure. It will thus be appreciated that those skilled in the art will be able to devise numerous systems and methods which, although not explicitly shown or described herein, embody the principles of the disclosure and are thus within the spirit and scope thereof.

What is claimed is:

1. A method for video decoding in a decoder, comprising:
receiving encoding information of a block associated with a picture in a coded video bitstream;
determining whether the block includes a valid region in the picture and an invalid region outside a boundary of the picture based on the encoding information; and
reconstructing at least one sample in the valid region of the block when the block is determined to include the valid region in the picture and the invalid region outside the boundary of the picture.

2. The method of claim 1, wherein the reconstructing the at least one sample comprises:
reconstructing samples only in the valid region of the block, the samples including the at least one sample.

3. The method of claim 1, wherein the at least one sample in the valid region has same prediction information and same transform information.

4. The method of claim 3, wherein the reconstructing the at least one sample comprises:
generating at least one prediction for the at least one sample in the valid region using the same prediction information;
obtaining at least one piece of residual data for the at least one sample using the same transform information; and
reconstructing the at least one sample based on the at least one prediction and the at least one piece of residual data.

5. The method of claim 1, wherein
the valid region has a rectangular shape with a width and a height, one of the width and the height is not a power of 2; and
the reconstructing the at least one sample includes:
generating at least one prediction for the at least one sample in the valid region only using a skip mode; and
reconstructing the at least one sample based on the at least one prediction without residual data.

6. The method of claim 1, wherein
the valid region has a rectangular shape with a width and a height, one of the width and the height is not a power of 2; and
the reconstructing the at least one sample includes:
generating at least one prediction for the at least one sample in the valid region using one of: an intra prediction mode and an inter prediction mode; and
reconstructing the at least one sample based on the at least one prediction without residual data.

7. The method of claim 1, wherein the block is divisible into a number of rectangular sub-blocks that have widths and heights being powers of 2, and the number of divisions to obtain the rectangular sub-blocks is less than a predetermined threshold.

8. The method of claim 1, wherein the valid region of the block is not obtainable by a single split of the block by one of: a quadtree split and a binary tree split.

9. The method of claim 1, wherein
the encoding information includes a non-split flag indicating that the block includes the valid region in the picture and the invalid region outside the boundary of the picture.

10. An apparatus, comprising processing circuitry configured to:
receive encoding information of a block associated with a picture in a coded video bitstream;
determine whether the block includes a valid region in the picture and an invalid region outside a boundary of the picture based on the encoding information; and
reconstruct at least one sample in the valid region of the block when the block is determined to include the valid region in the picture and the invalid region outside the boundary of the picture.

11. The apparatus of claim 10, wherein the processing circuitry is further configured to:
reconstruct samples only in the valid region of the block, the samples including the at least one sample.

12. The apparatus of claim 10, wherein the at least one sample in the valid region has same prediction information and same transform information.

13. The apparatus of claim 12, wherein the processing circuitry is further configured to:
generate at least one prediction for the at least one sample in the valid region using the same prediction information;
obtain at least one piece of residual data for the at least one sample using the same transform information; and
reconstruct the at least one sample based on the at least one prediction and the at least one piece of residual data.

14. The apparatus of claim 10, wherein
the valid region has a rectangular shape with a width and a height, one of the width and the height is not a power of 2; and
the processing circuitry is further configured to:
generate at least one prediction for the at least one sample in the valid region only using a skip mode; and
reconstruct the at least one sample based on the at least one prediction without residual data.

15. The apparatus of claim 10, wherein
the valid region has a rectangular shape with a width and a height, one of the width and the height is not a power of 2; and
the processing circuitry is further configured to:
generate at least one prediction for the at least one sample in the valid region using one of: an intra prediction mode and an inter prediction mode; and
reconstruct the at least one sample based on the at least one prediction without residual data.

16. The apparatus of claim 10, wherein the block is divisible into a number of rectangular sub-blocks that have widths and heights being powers of 2, and the number of divisions to obtain the rectangular sub-blocks is less than a predetermined threshold.

17. The apparatus of claim 10, wherein the valid region of the block is not obtainable by a single split of the block by one of: a quadtree split and a binary tree split.

18. The apparatus of claim 10, wherein
the encoding information includes a non-split flag indicating that the block includes the valid region in the picture and the invalid region outside the boundary of the picture.

19. A non-transitory computer-readable storage medium storing a program executable by at least one processor to perform:
receiving encoding information of a block associated with a picture in a coded video bitstream;

determining whether the block includes a valid region in the picture and an invalid region outside a boundary of the picture based on the encoding information; and reconstructing at least one sample in the valid region of the block when the block is determined to include the valid region in the picture and the invalid region outside the boundary of the picture.

\* \* \* \* \*